(12) United States Patent
Kursun

(10) Patent No.: US 11,526,725 B2
(45) Date of Patent: Dec. 13, 2022

(54) ATTENTION-BASED LAYERED NEURAL NETWORK ARCHITECTURE FOR EXPLAINABLE AND HIGH-PERFORMANCE AI PROCESSING

(71) Applicant: BANK OF AMERICA CORPORATION, Charlotte, NC (US)

(72) Inventor: Eren Kursun, New York City, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 556 days.

(21) Appl. No.: 16/706,529

(22) Filed: Dec. 6, 2019

(65) Prior Publication Data

US 2021/0173905 A1 Jun. 10, 2021

(51) Int. Cl.
*G06N 3/04* (2006.01)
*G06F 21/31* (2013.01)
(Continued)

(52) U.S. Cl.
CPC .............. *G06N 3/04* (2013.01); *G06F 16/904* (2019.01); *G06F 21/316* (2013.01);
(Continued)

(58) Field of Classification Search
CPC .. G06F 21/316; G06F 11/3438; G06F 16/285; G06F 16/287; G06F 16/904;
(Continued)

(56) References Cited

U.S. PATENT DOCUMENTS

| 6,334,121 B1 * | 12/2001 | Primeaux | G06F 21/554 |
| | | | 706/62 |
| 9,934,462 B1 * | 4/2018 | Healey | G06N 3/0454 |
| (Continued) | | | |

FOREIGN PATENT DOCUMENTS

WO WO-2018217019 A1 * 11/2018 .............. G06F 21/56

OTHER PUBLICATIONS

Bui, Nghi D. Q., et al., AutoFocus: Interpreting Attention-based Neural Networks by Code Perturbation, 2019 34th IEEE/ACM International Conference on Automated Software Engineering (ASE), Nov. 11-15, 2019, pp. 38-41, [retrieved on Sep. 12, 2022], Retrieved from the Internet: <URL:http://ieeexplore.ieee.org/>.*

(Continued)

*Primary Examiner* — Geoffrey R St Leger
(74) *Attorney, Agent, or Firm* — Moore & Van Allen PLLC; R. W. McCord Rayburn

(57) ABSTRACT

A system for attention-based layered neural network classification is provided. The system comprises: a sequence of layered neural networks; and a controller configured for controlling data routed through the sequence of layered neural networks, the controller configured to: receive interaction data comprising data features, wherein the data features are distinct characteristics of the interaction data; input data features into the sequence of layered neural networks, wherein each sequential layer of the sequence of layered neural networks comprises a heightened rigor level for at least one of the data features; calculate a relevance score output for at least one of the data features at each layer of the sequence of layered neural networks; and integrate the relevance score output from each layer of the sequence of layered neural networks to generate a total relevance score output.

18 Claims, 20 Drawing Sheets

(51) Int. Cl.
*G06F 16/904* (2019.01)
*G06K 9/62* (2022.01)
*G06N 3/08* (2006.01)

(52) U.S. Cl.
CPC ......... *G06K 9/6267* (2013.01); *G06N 3/0454* (2013.01); *G06N 3/084* (2013.01)

(58) Field of Classification Search
CPC ...... H04L 67/535; G06N 3/04; G06N 3/0454; G06N 3/084; G06V 10/82; G06K 9/6267
See application file for complete search history.

(56) References Cited

U.S. PATENT DOCUMENTS

| 10,769,223 B1* | 9/2020 | Patel | G06Q 50/01 |
| 2018/0121799 A1* | 5/2018 | Hashimoto | G06N 3/0454 |
| 2020/0356803 A1* | 11/2020 | Yang | G06N 3/082 |

OTHER PUBLICATIONS

Gilpin, Leilani H., Explaining Explanations: An Overview of Interpretability of Machine Learning, 2018 IEEE 5th International Conference on Data Science and Advanced Analytics (DSAA), Oct. 1-3, 2018, pp. 80-89, [retrieved on Sep. 12, 2022], Retrieved from the Internet: <URL:http://ieeexplore.ieee.org/>.*

* cited by examiner

ATTENTION-BASED LAYERED NEURAL NETWORK ARCHITECTURE FOR EXPLAINABLE AND HIGH-PERFORMANCE AI PROCESSING

BACKGROUND

As artificial intelligence techniques, such as machine learning, have become more commonly used in decision making processes, explainability for these decisions has become increasingly important for reliability and proper use of such systems. In recent years, a wide range of decisioning systems have started incorporating artificial intelligence systems in their processes. Non-limiting examples of these systems include airport or public transportation security systems, misappropriation detection systems, and diagnostic systems. Explainability in artificial intelligence decisioning has also attracted significant attention from regulators, as critical decisions are increasingly made by such systems. As such, regulations are beginning to mandate requirements for explainability of the underlying decisions made by artificial intelligence systems.

That said, explainability and interpretability remain as one of the grand challenges in artificial intelligence. Various studies have highlighted that the performance or accuracy of such decisioning systems are generally inversely proportional to the explainability or interpretability of their decision making processes. While most entities and users have a strong interest in responsible and explainable decision making with the help of artificial intelligence, current tools and technologies to enable these goals are very limited at this point. As such, there is a need for an improved approach for determining and displaying the explainability in decisioning systems, and specifically, in misappropriation detection and alert processing systems.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system for attention-based layered neural network classification is provided. The system comprises: a sequence of layered neural networks; and a controller configured for controlling data routed through the sequence of layered neural networks, the controller comprising a memory device with computer-readable program code stored thereon, a communication device connected to a network, and a processing device, wherein the processing device is configured to execute the computer-readable program code to: receive interaction data comprising data features, wherein the data features are distinct characteristics of the interaction data; input data features into the sequence of layered neural networks, wherein each sequential layer of the sequence of layered neural networks comprises a heightened rigor level for at least one of the data features; calculate a relevance score output for at least one of the data features at each layer of the sequence of layered neural networks; and integrate the relevance score output from each layer of the sequence of layered neural networks to generate a total relevance score output.

In a particular embodiment, the total relevance score output is a relevance visualization map incorporating the relevance score output from each layer of the sequence of layered neural networks.

In another embodiment, the processing device is further configured to execute the computer-readable program code to determine that a level of detail for each data feature has reached a predetermined threshold before generating the total relevance score output.

In yet another embodiment, the sequence of layered neural networks comprises a first neural network layer and a second neural network layer, wherein an output from the first neural network layer is input into the second neural network layer.

In yet another embodiment, the first neural network layer comprises a first rigor level and the second neural network layer comprises a second rigor level, and wherein the second rigor level is higher than the first rigor level for at least one of the data features.

In yet another embodiment, the processing device is further configured to execute the computer-readable program code to identify an abnormal portion of the relevance score output from a layer of the sequence of layered neural networks, wherein the abnormal portion is input into a subsequent layer of the sequence of layered neural networks.

In yet another embodiment, the interaction data comprises resource transfer data, and wherein the sequence of layered neural networks is configured to identify patterns in the interaction data associated with potential misappropriation.

In yet another embodiment, the interaction data comprises user interaction data, and wherein the sequence of layered neural networks is configured to identify patterns in the interaction data associated with potential unauthorized account access.

A system for attention-based layered neural network classification is also provided. The system comprises: a first neural network layer; a second neural network layer; and a controller configured for controlling sequential data routing through the first and second neural network layers, the controller comprising a memory device with computer-readable program code stored thereon, a communication device connected to a network, and a processing device, wherein the processing device is configured to execute the computer-readable program code to: receive interaction data comprising data features at the first neural network layer, wherein the data features are distinct characteristics of the interaction data; calculate a first relevance score output for the data features in the first neural network layer, the first neural network having a first rigor level for each of the data features; identify an abnormal portion of the first relevance score output associated with at least one of the data features; input the abnormal portion into the second neural network layer, wherein the second neural network layer comprises a second rigor level for the at least one of the data features, and wherein the second rigor level is higher than the first rigor level; calculate a second relevance score output for the at least one of the data features associated with the abnormal portion in the second neural network layer; and integrate the first relevance score output and the second relevance score output to generate a total relevance score output.

In a particular embodiment, the combined relevance score output is a relevance visualization map. In another embodiment, the second relevance score output is a refined relevance visualization map for the abnormal portion of the first relevance score output.

In yet another embodiment, the processing device is further configured to execute the computer-readable program code to determine that a level of detail for each data feature has reached a predetermined threshold before generating the total relevance score output.

In yet another embodiment, the interaction data comprises resource transfer data, and wherein the sequence of layered neural networks is configured to identify patterns in the interaction data associated with potential misappropriation.

In yet another embodiment, the interaction data comprises user interaction data, and wherein the sequence of layered neural networks is configured to identify patterns in the interaction data associated with potential unauthorized account access.

A computer-implemented method for attention-based layered neural network classification is also provided. The computer-implemented method comprises: providing a sequence of layered neural networks; and providing a controller configured for controlling data routed through the sequence of layered neural networks, the controller comprising a memory device with computer-readable program code stored thereon, a communication device connected to a network, and a processing device, wherein the processing device is configured to execute the computer-readable program code to: receive interaction data comprising data features, wherein the data features are distinct characteristics of the interaction data; input data features into the sequence of layered neural networks, wherein each sequential layer of the sequence of layered neural networks comprises a heightened rigor level for at least one of the data features; calculate a relevance score output for at least one of the data features at each layer of the sequence of layered neural networks; and integrate the relevance score output from each layer of the sequence of layered neural networks to generate a total relevance score output.

In a particular embodiment, the total relevance score output is a relevance visualization map incorporating the relevance score output from each layer of the sequence of layered neural networks.

In another embodiment, the processing device is further configured to execute the computer-readable program code to determine that a level of detail for each data feature has reached a predetermined threshold before generating the total relevance score output.

In yet another embodiment, the sequence of layered neural networks comprises a first neural network layer and a second neural network layer, wherein an output from the first neural network layer is input into the second neural network layer. In yet another embodiment, the first neural network layer comprises a first rigor level and the second neural network layer comprises a second rigor level, and wherein the second rigor level is higher than the first rigor level for at least one of the data features.

In yet another embodiment, the processing device is further configured to execute the computer-readable program code to identify an abnormal portion of the relevance score output from a layer of the sequence of layered neural networks, wherein the abnormal portion is input into a subsequent layer of the sequence of layered neural networks.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
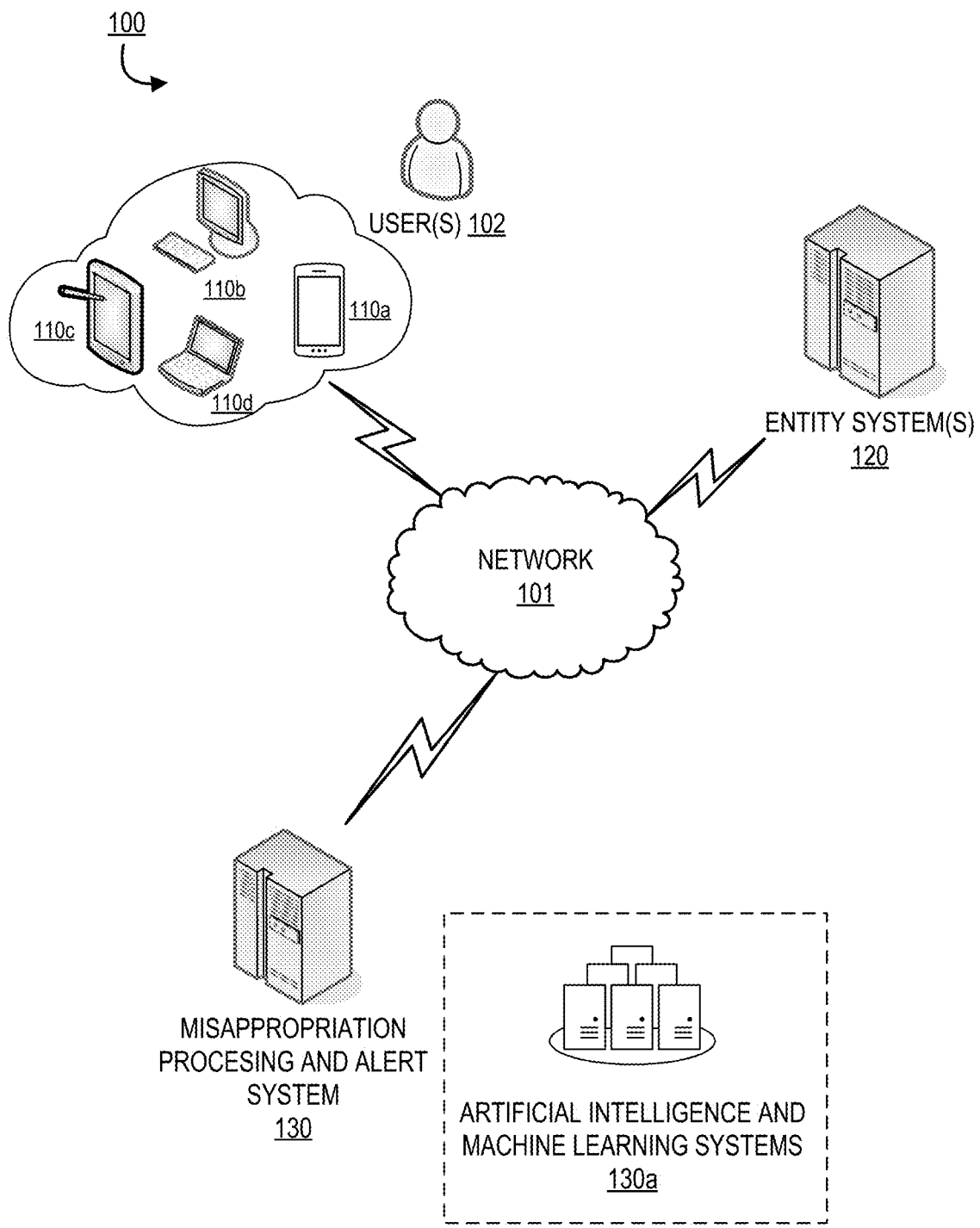
Figure 2:
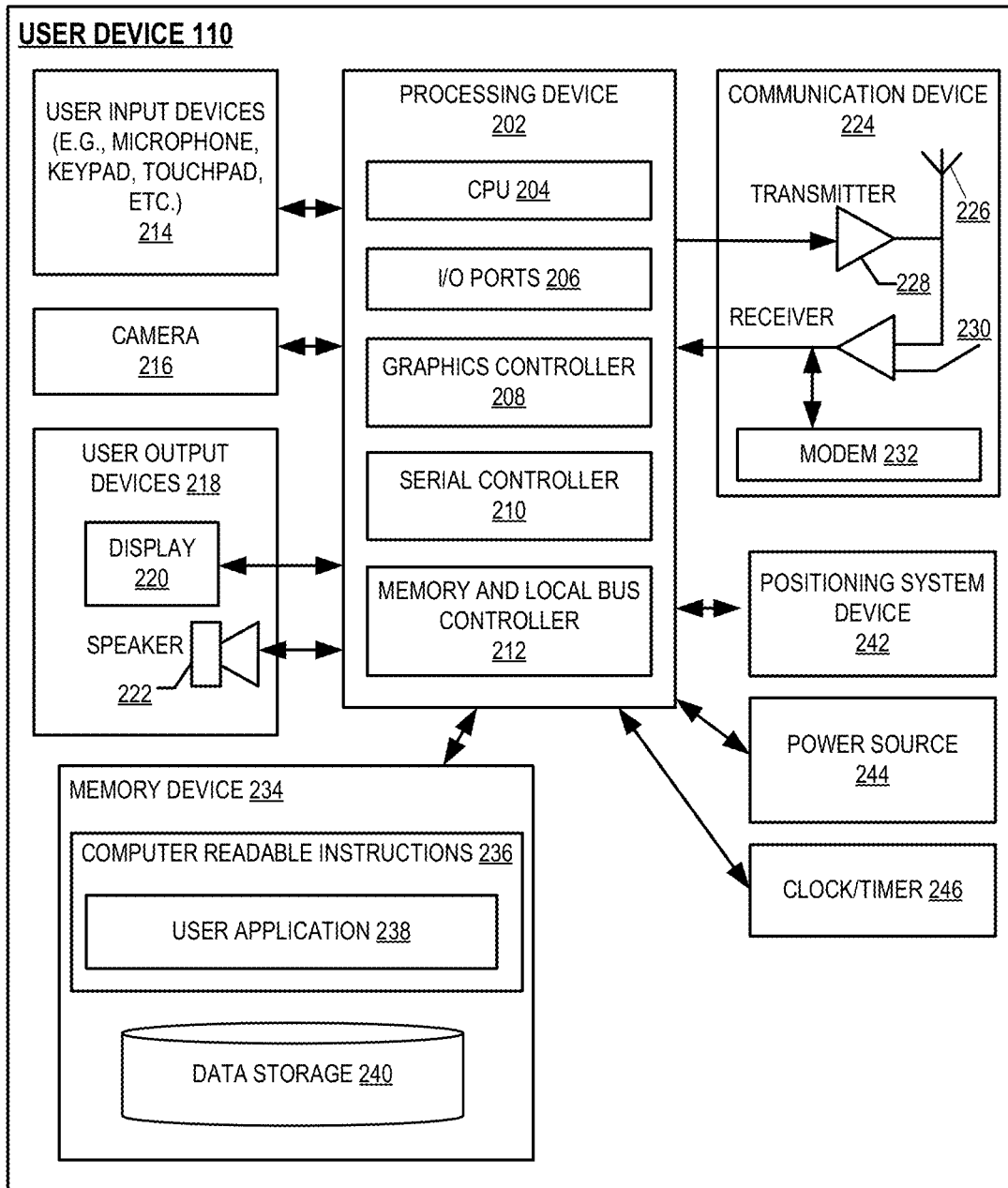
Figure 3:
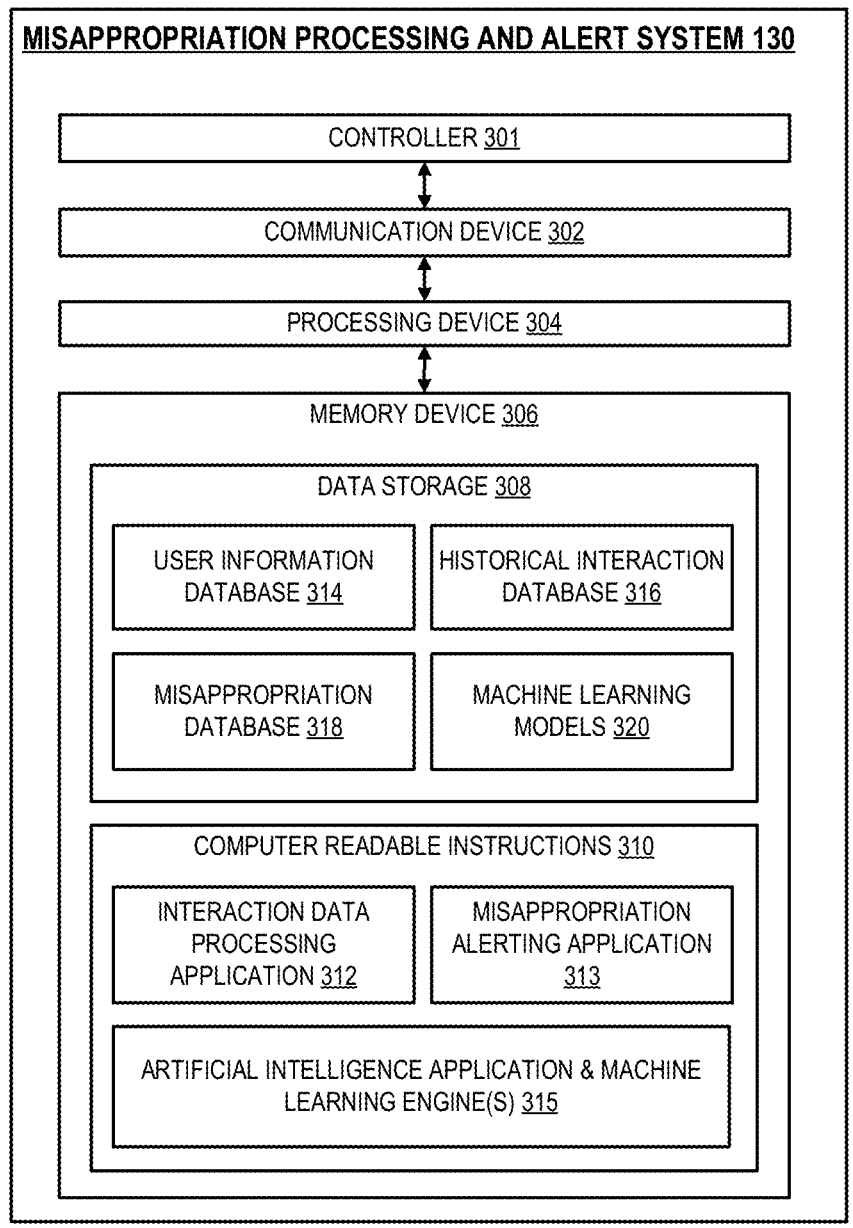
Figure 4:
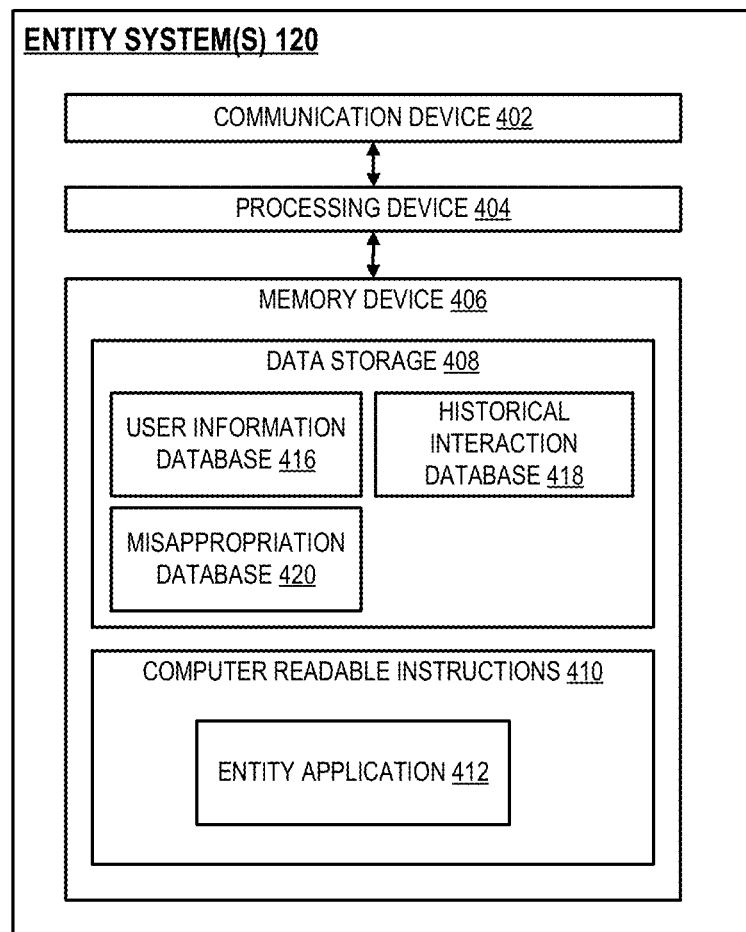
Figure 5:
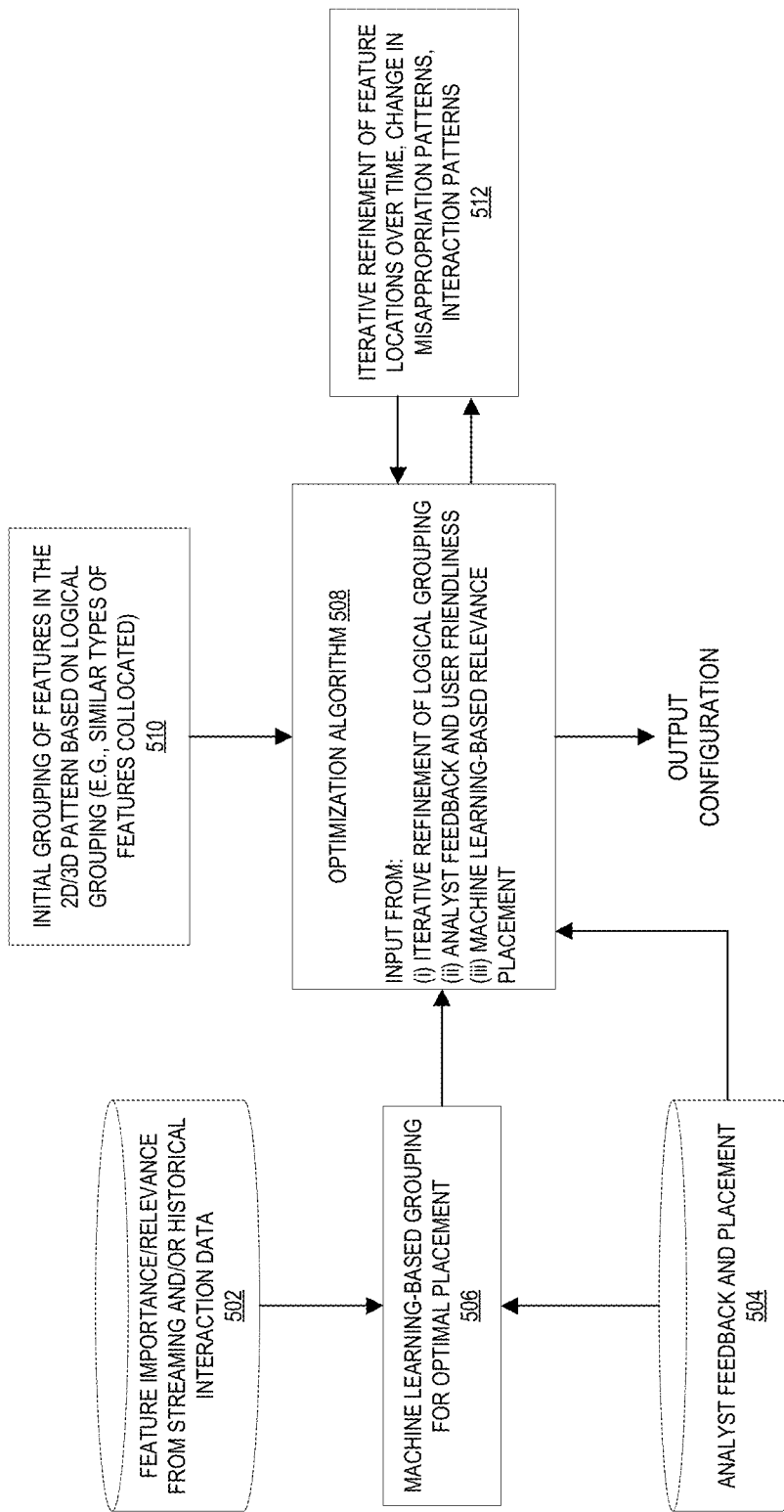
Figure 6:
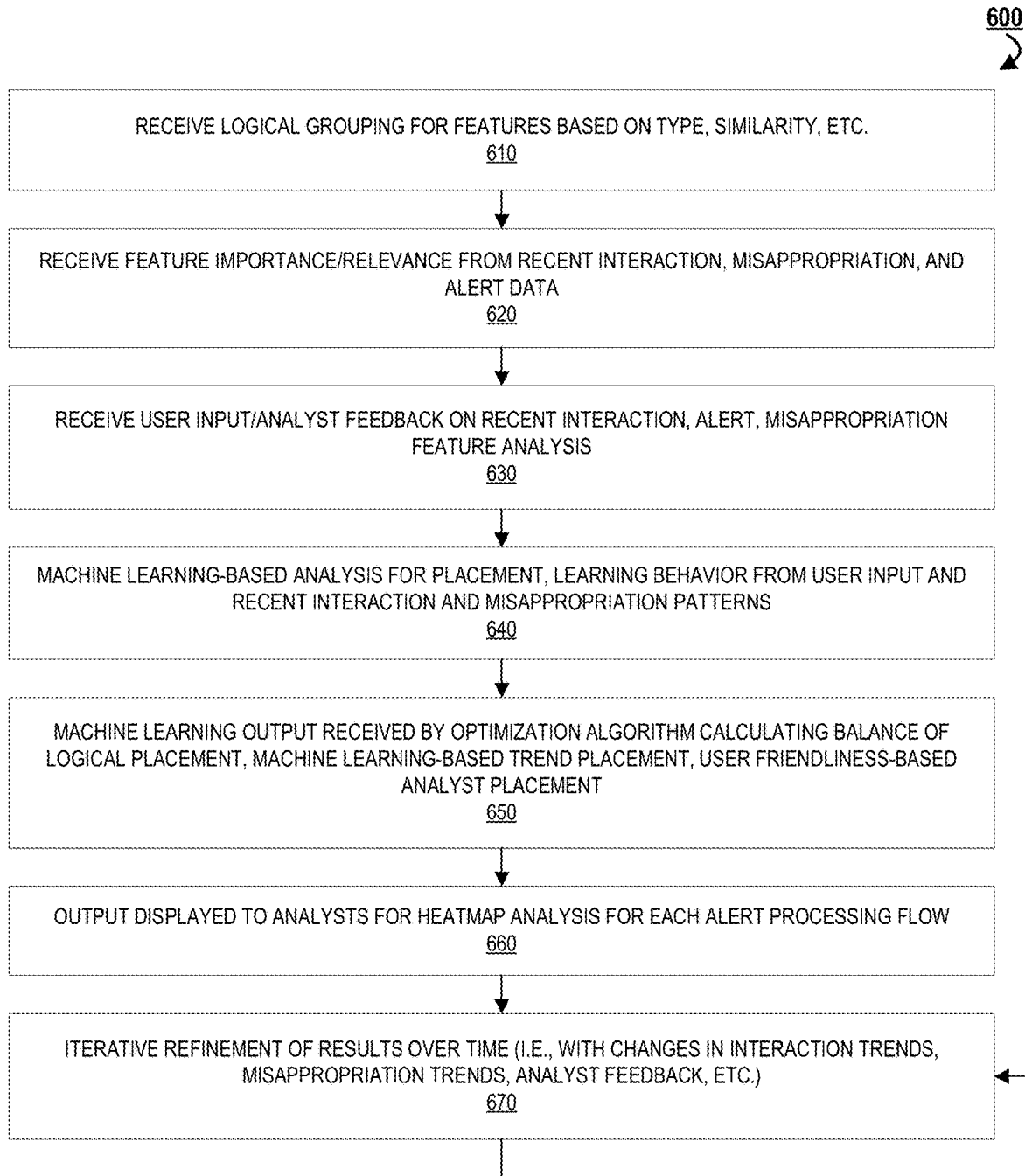
Figure 7:
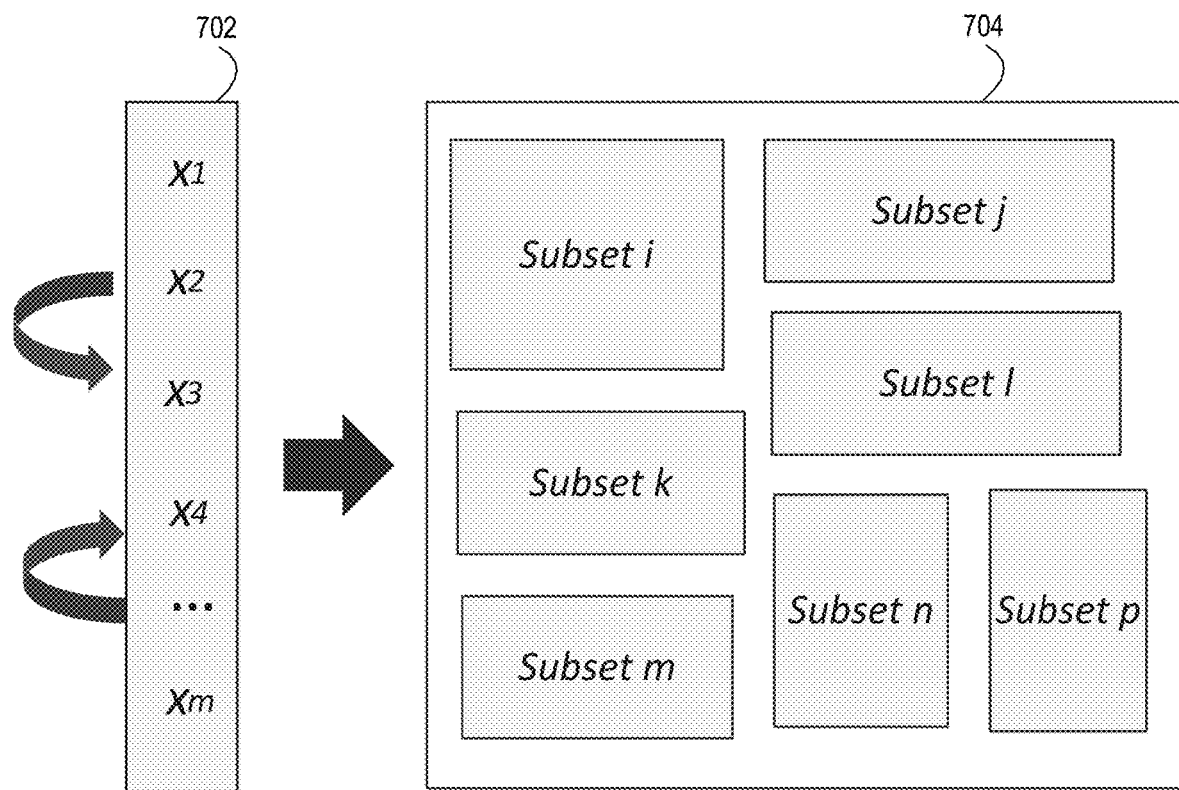
Figure 8:
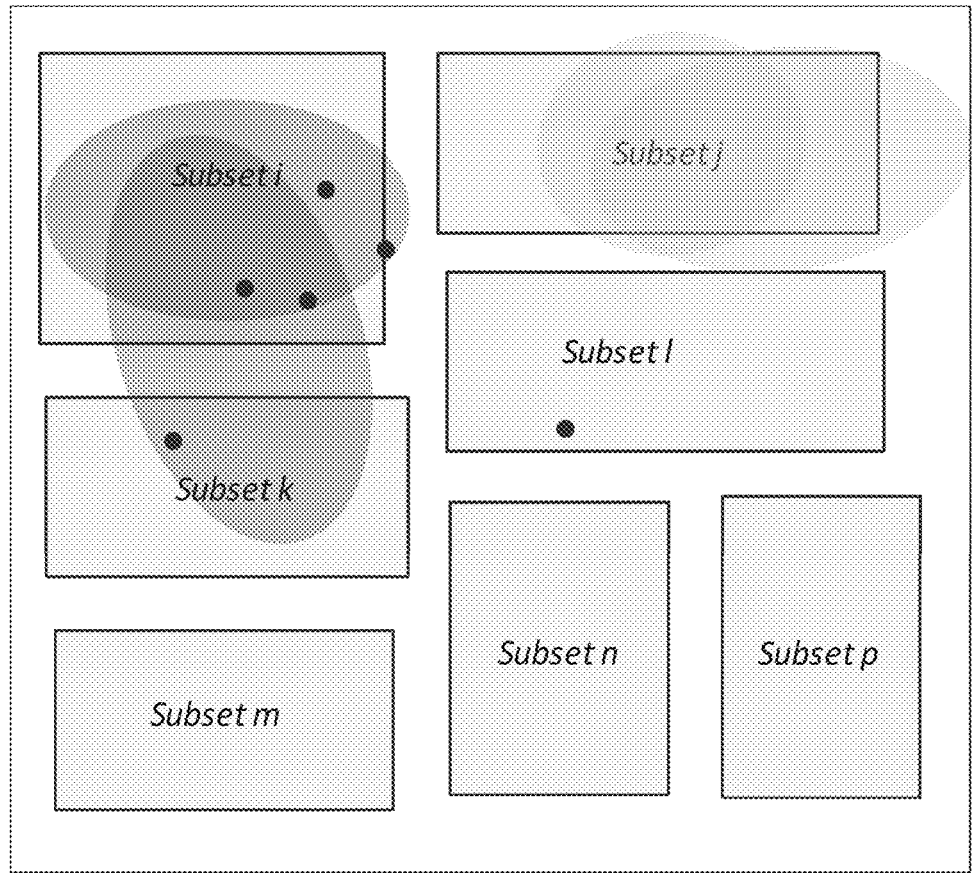
Figure 9:
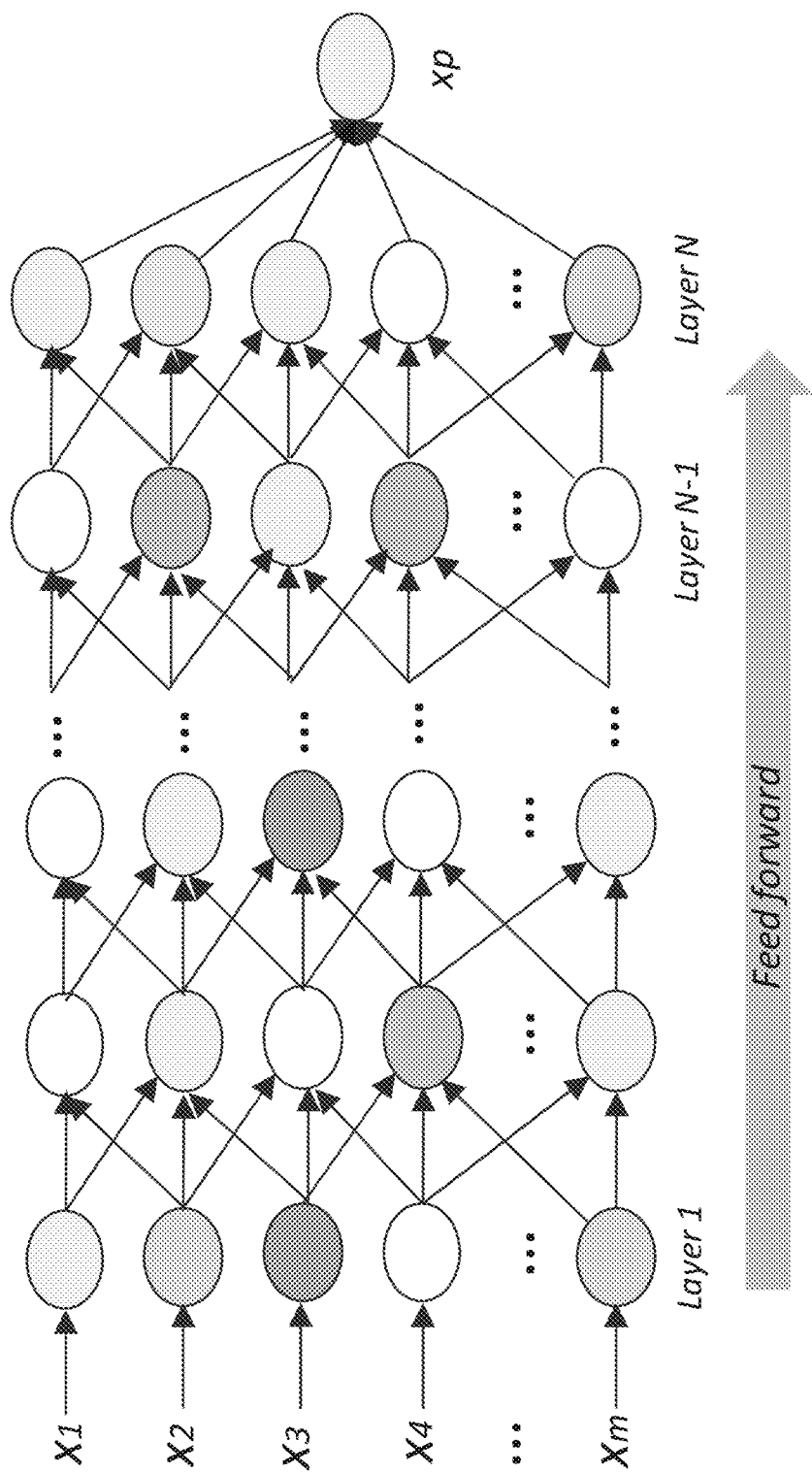
Figure 10:
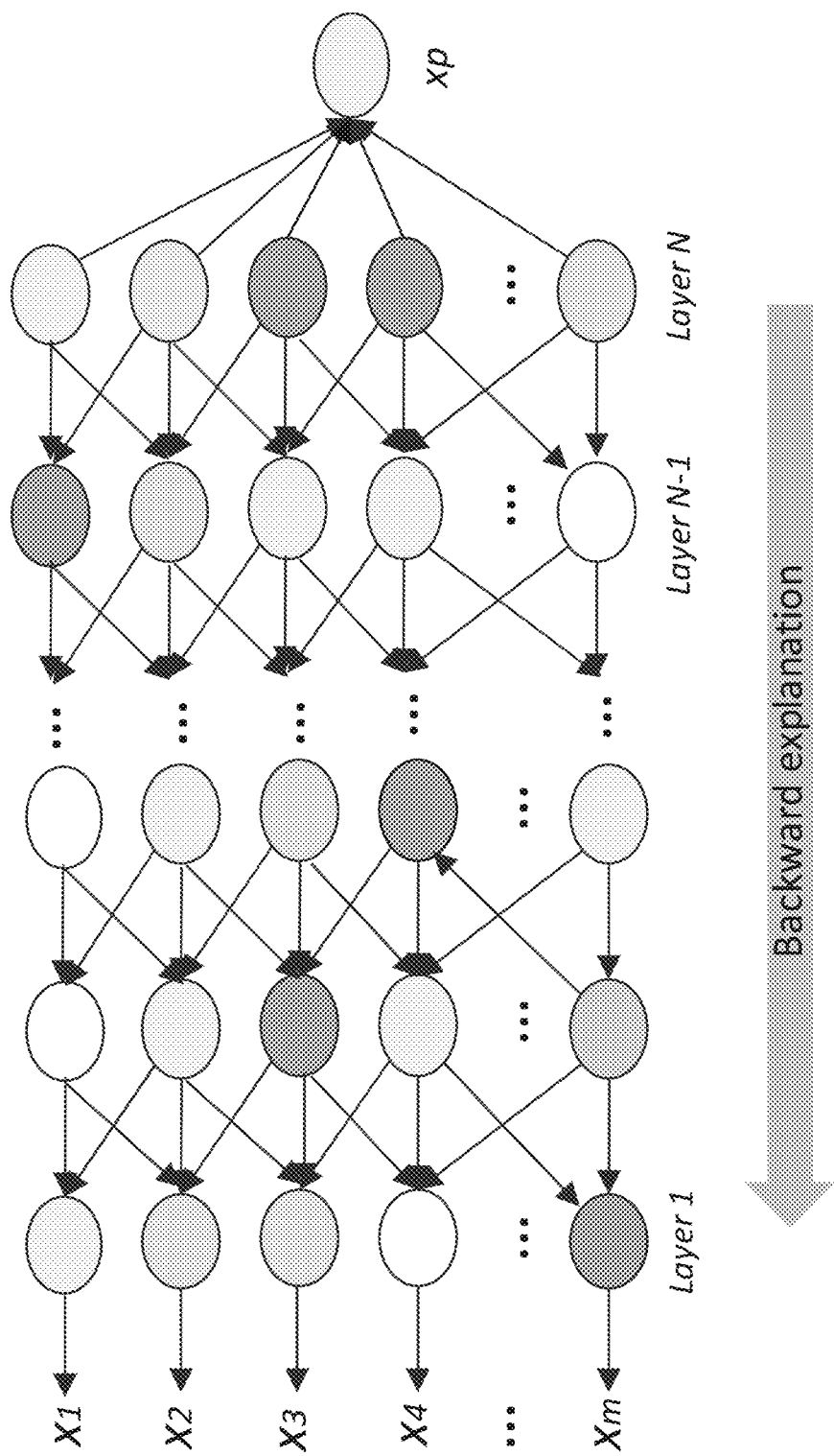
Figure 11:
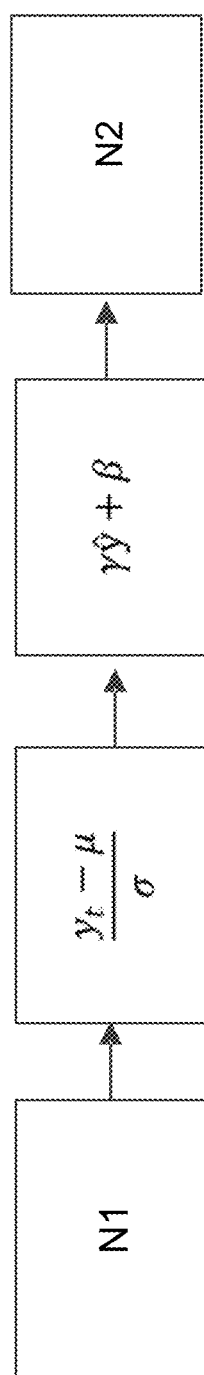
Figure 12:
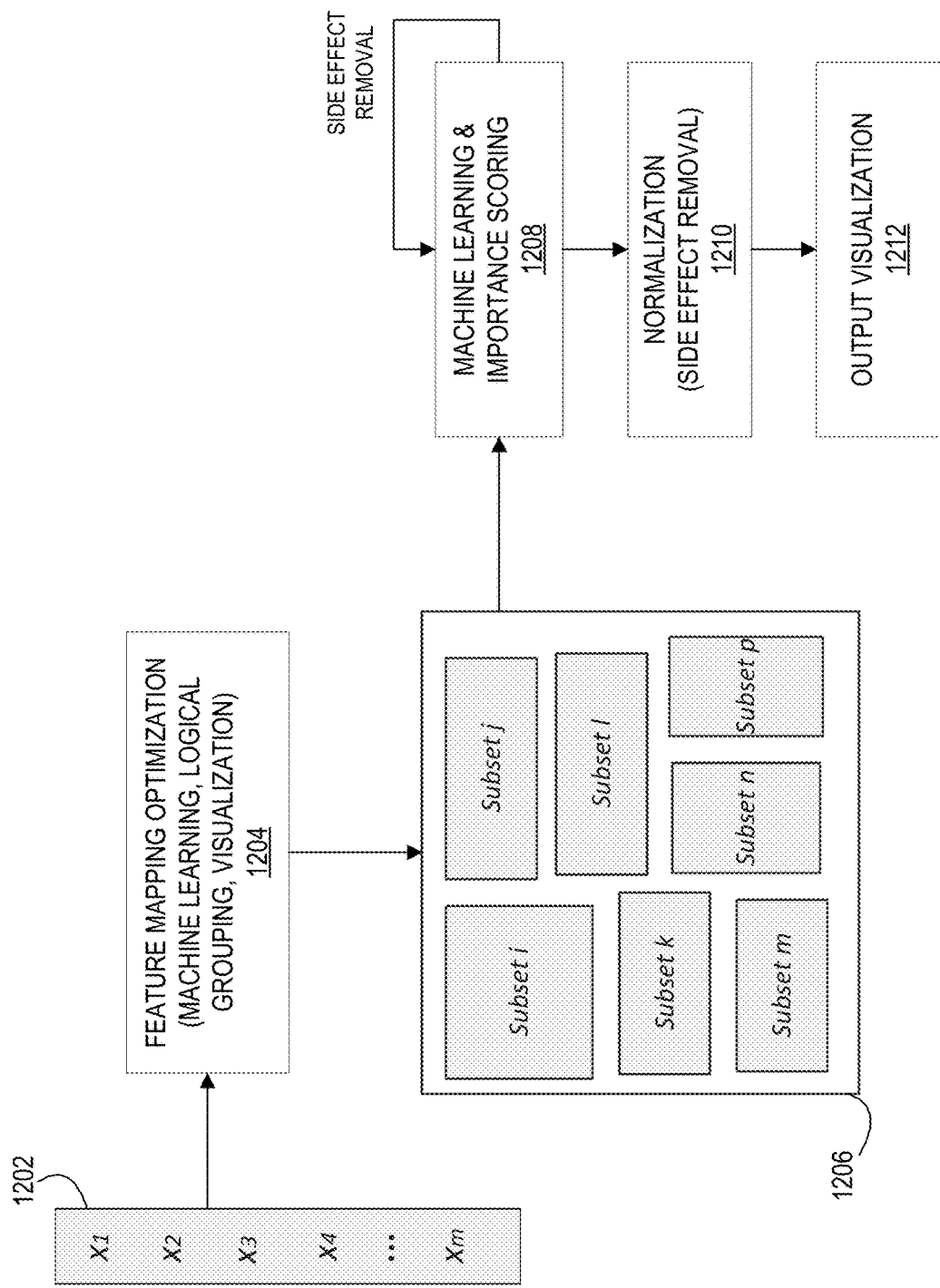
Figure 13:
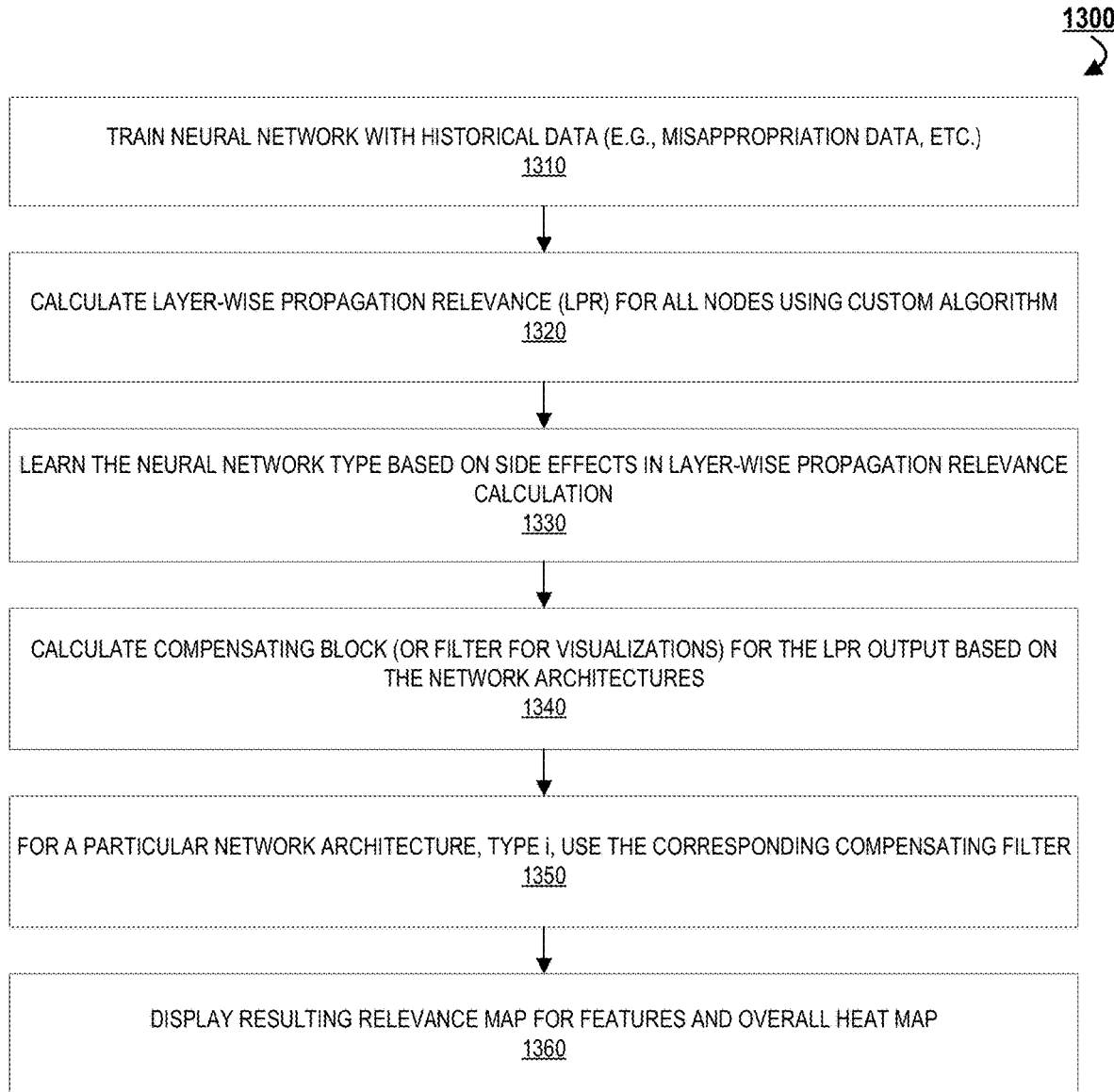
Figure 14:
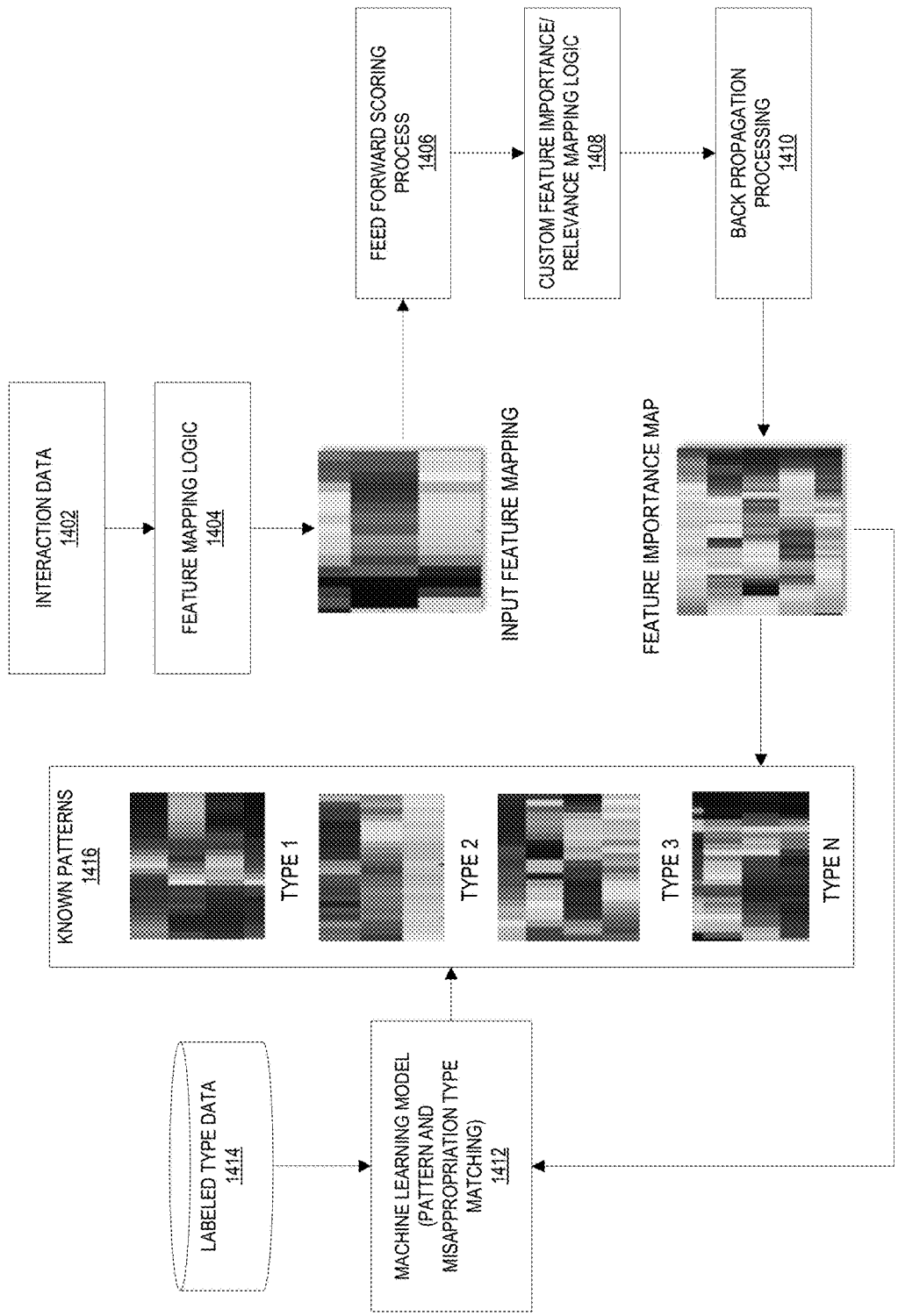
Figure 15:
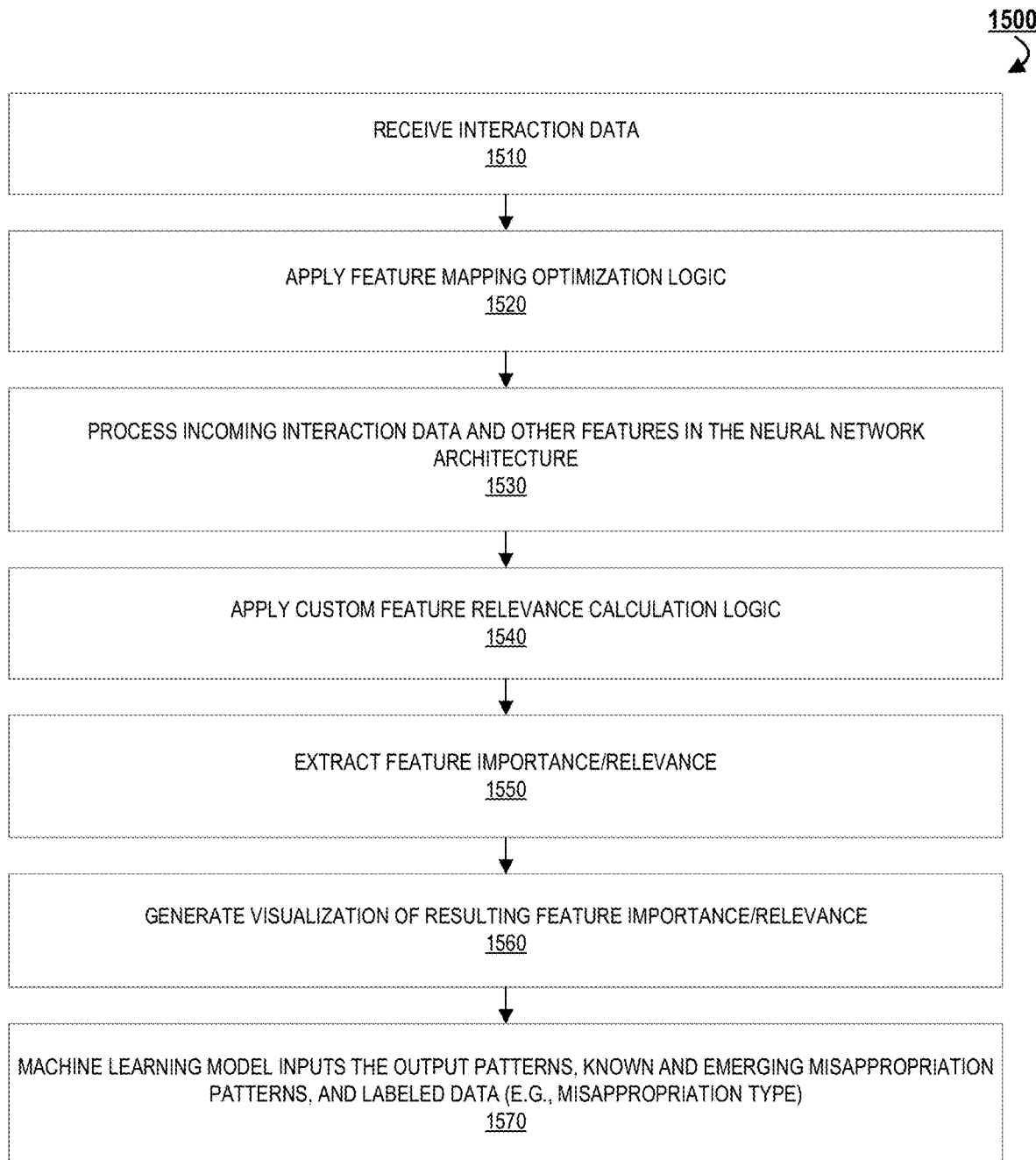
Figure 16:
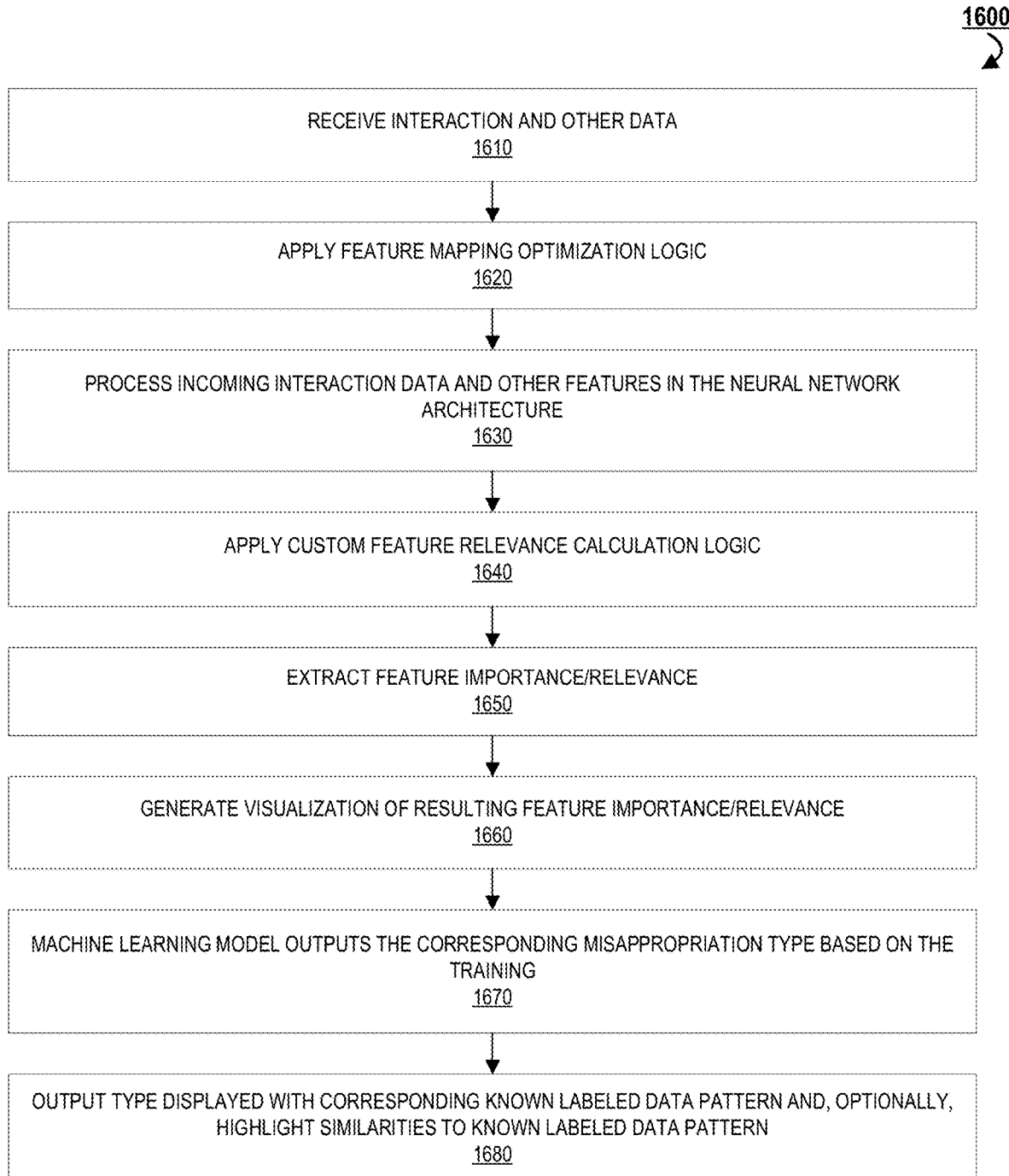
Figure 17:
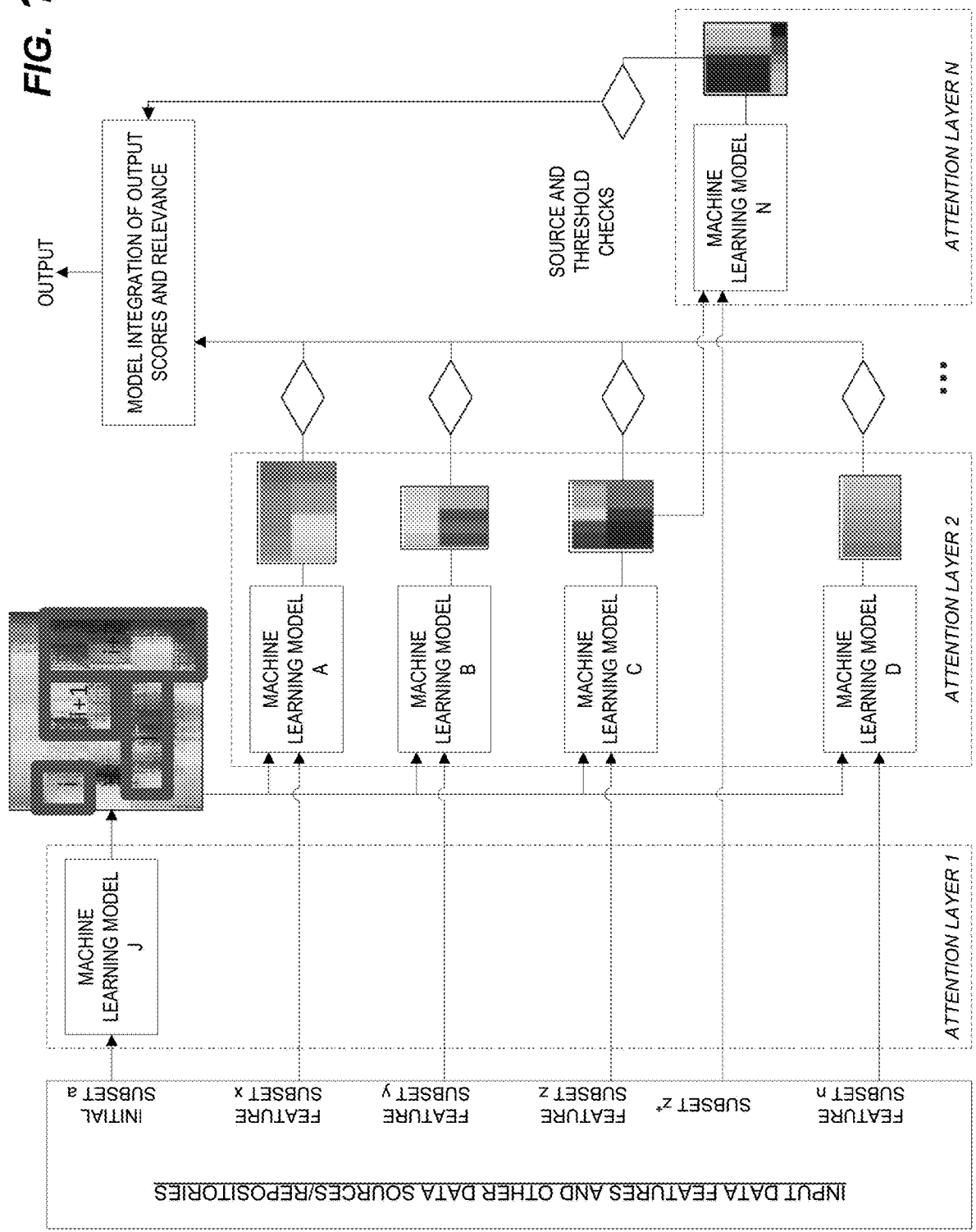
Figure 18:
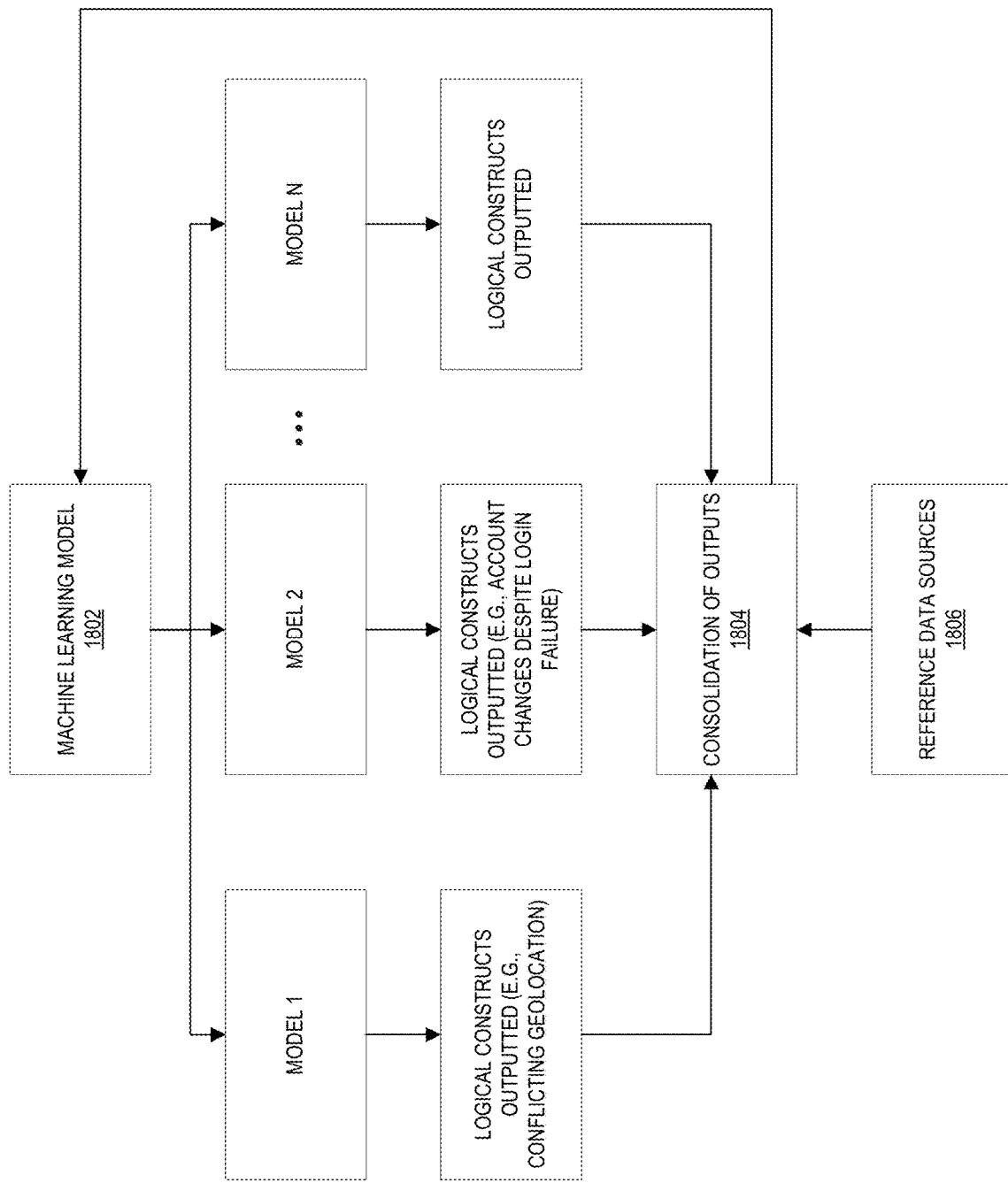
Figure 19A:
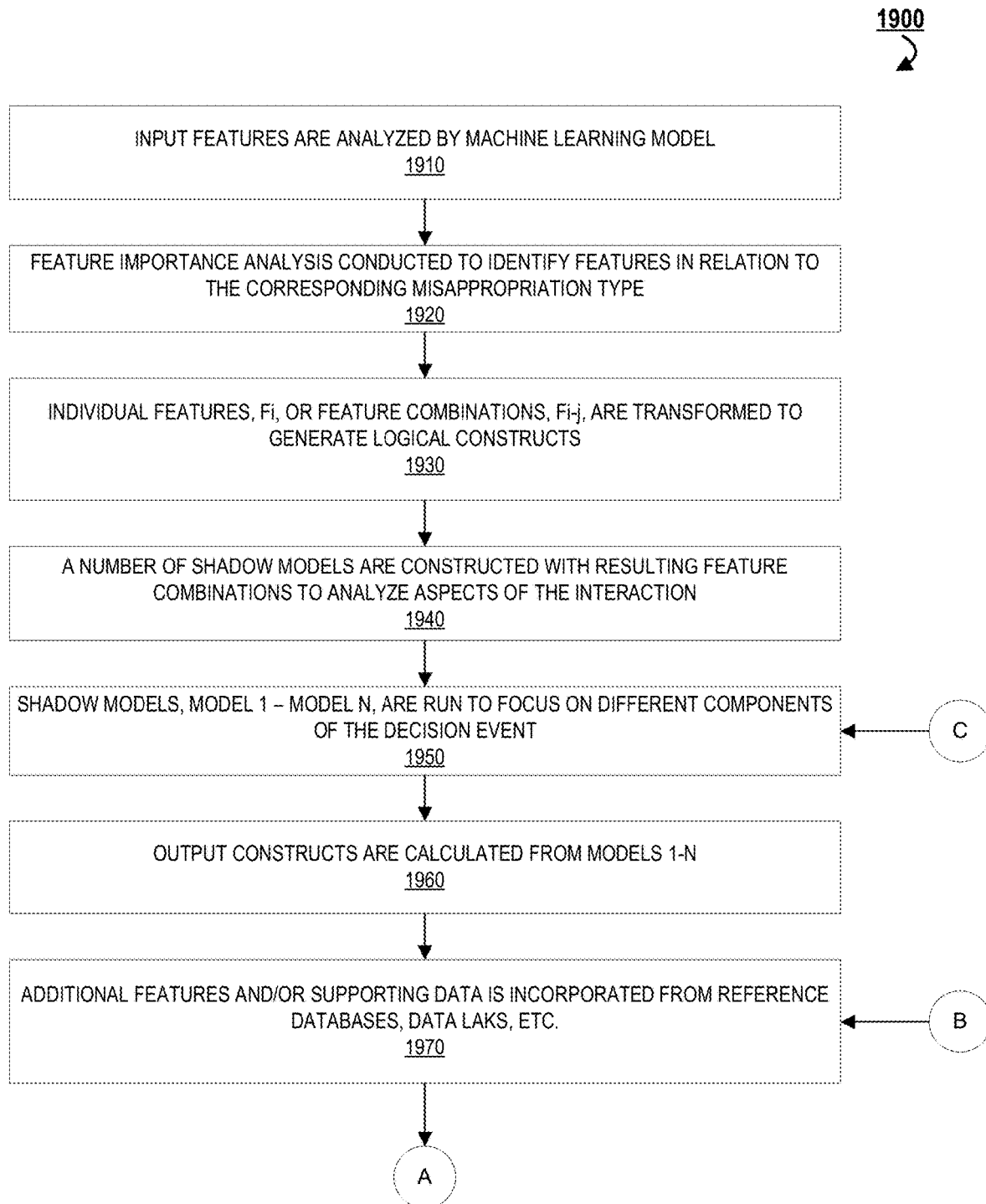
Figure 19B:
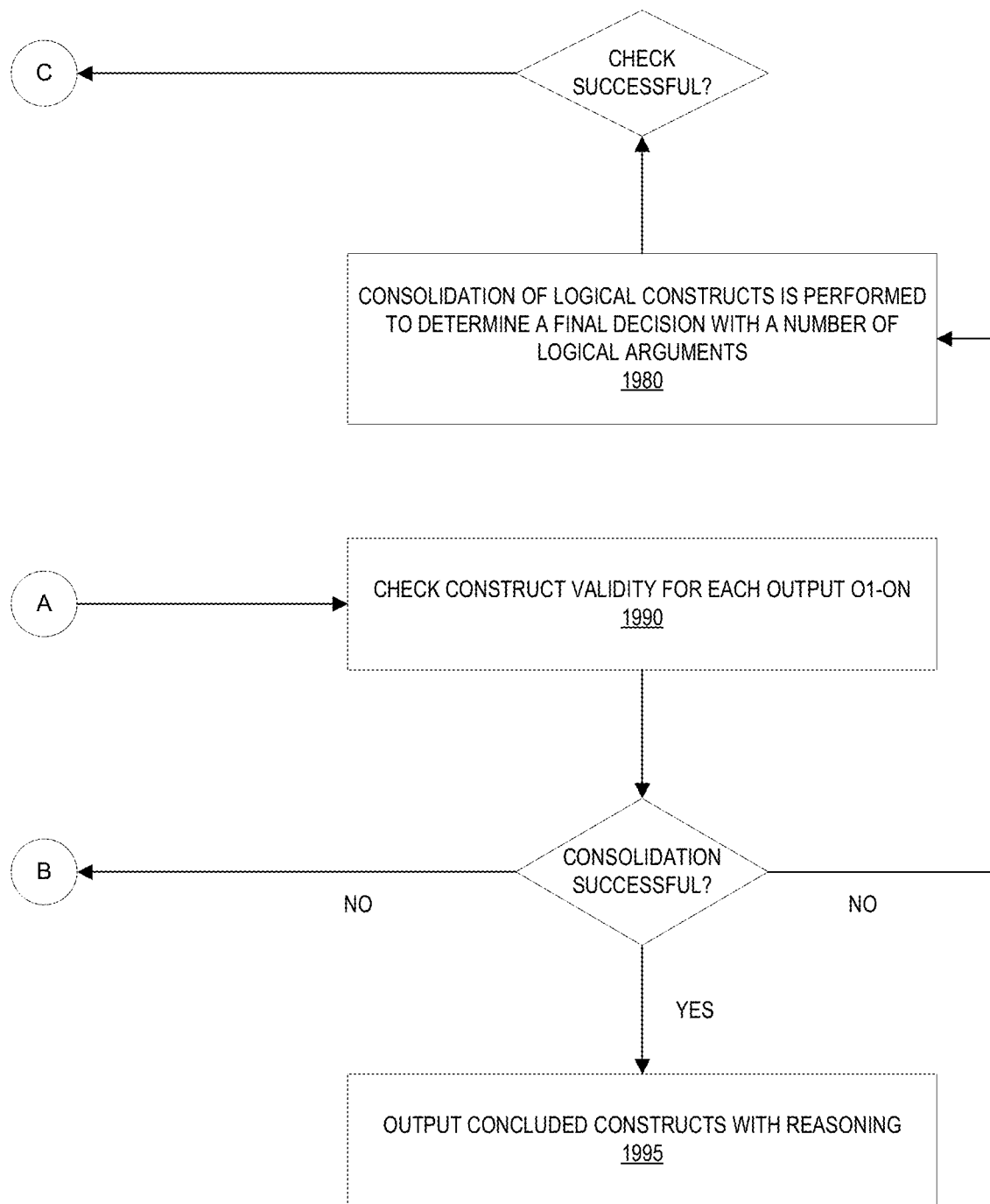

Having thus described embodiments of the invention in general terms, reference will now be made to the accompanying drawings, wherein:

FIG. 1 provides an artificial intelligence-based interaction processing system environment, in accordance with one embodiment of the invention;

FIG. 2 provides a block diagram of a user device, in accordance with one embodiment of the invention;

FIG. 3 provides a block diagram of misappropriation processing and alerting system, in accordance with one embodiment of the invention;

FIG. 4 provides a block diagram of an entity system, in accordance with one embodiment of the invention;

FIG. 5 provides a high level process diagram for optimized feature grouping, in accordance with one embodiment of the invention;

FIG. 6 provides a high level process flow for generating and displaying an optimized misappropriation relevance visualization, in accordance with one embodiment of the invention;

FIG. 7 provides a block diagram of an exemplary visualization output of grouped features, in accordance with one embodiment of the invention;

FIG. 8 provides a block diagram of an exemplary relevance visualization heat map, in accordance with one embodiment of the invention;

FIG. 9 provides a block diagram of a neural network for feed-forward scoring, in accordance with one embodiment of the invention;

FIG. 10 provides block diagram of a neural network for backpropagation relevance scoring, in accordance with one embodiment of the invention;

FIG. 11 provides a block diagram for batch normalization of neural network output, in accordance with one embodiment of the invention;

FIG. 12 provides a high level process diagram for a customized relevance scoring with batch normalization, in accordance with one embodiment of the invention;

FIG. 13 provides a high level process flow for generating and applying a compensating filter to a relevance visualization, in accordance with one embodiment of the invention;

FIG. 14 provides a high level process diagram for machine learning-based misappropriation pattern recognition, training, and matching, in accordance with one embodiment of the invention;

FIG. 15 provides a high level process flow for machine learning-based training for misappropriation type pattern recognition, in accordance with one embodiment of the invention;

FIG. 16 provides a high level process flow for machine learning-based misappropriation type pattern identification, in accordance with one embodiment of the invention;

FIG. 17 provides a high level process diagram for attention-based relevance calculation in a stacked neural network architecture, in accordance with one embodiment of the invention;

FIG. 18 provides a high level process diagram for machine learning output relevance scoring using an array of shadow models, in accordance with one embodiment of the invention;

FIG. 19A provides a high level process flow for extracting logical constructs using an array of shadow engines, in accordance with one embodiment of the invention; and FIG. 19B provides high level process flow for consolidation of outputs from an array of shadow engines, in accordance with one embodiment of the invention.

DETAILED DESCRIPTION OF EMBODIMENTS OF THE INVENTION

Embodiments of the invention, as described herein, leverage complex, specific-use computer system to provide a novel approach for providing enhanced artificial intelligence-derived decisioning explainability, and specifically for misappropriation processing and alerting systems. The systems of the present invention, are configured to determine relevance scoring for various data features of machine learning-derived decisions (e.g., classified misappropriation types) while also providing user-friendly result outputs that may be easily analyzed and interpreted by human users (e.g., analysts).

As a first part of the overall solution, the system implements an optimization algorithm or engine for logical grouping of identified data features within a feature mapping visualization (e.g., a two or three dimensional image or chart). The input features are ranked and/or highlighted based on their importance and relevance to the decisioning event. The optimization algorithm is configured to use a combination of logical grouping and machine learning-based tuning to group the features into subsets within the visualization. For example, within a generated visualization image, the system may modify placement of pixels within the visualization for improving a displayed result to a user. In addition, to the logical grouping of similar characteristics and machine learning-based refinement, the system further incorporates analyst input for an additional optimization step to help ensure for intuitive interpretation of the features by human users receiving the visualization. The system is also configured to iteratively refine, with machine learning guidance, the placement and grouping of individual features and feature pairs or groups within the visualization as additional streaming interaction and misappropriation data is received over time.

A resulting feature importance or relevance visualization may provide both individual feature level importance as shown as dots, as well as a high-level heat map with important or relevant regions of interest or areas indicated with an overlaid elliptical shape or other free-form shape (e.g., as illustrated in FIG. 8). In some embodiments, in a heat map, the displayed visualization is configured to display positive and negative areas that contribute to the classification outcome of the decision with a spectrum of colors similar to that of a thermal heat map. In a non-limiting example, more relevant or important features that provide a positive contribution to the classification may be indicated with a darker red hue, while less important or relevant features with a negative contribution may be indicated with a darker blue hue.

This improved visualization construction technique overcomes the technical problem inherent to typical construction methods such as random placement, wherein the random placement has limited interpretability for human analysts. Instead, the resulting visualization of the present invention provides enhanced interpretability and explainability of the results.

Embodiments of the present invention are further configured to utilize a custom relevance calculation to provide explainability through backward propagation of importance or relevance. In particular, this custom calculation is beneficial in neural network-based arrangements which can contain multiple layers of non-linear functional structure that can potentially complicate deciphering of an output. In many cases, standard techniques alone, such as layer-wise relevance propagation, have inherent side effects, such as failed assumptions due to the underlying neural network architecture, which can impair relevance calculation results. Various classes of neural network architectures introduce such side effects not only in the feed-forward scoring process but also in the backwards relevance calculations. In this invention, a machine learning-based technique is employed to learn the neural network architecture-specific side effects present in the relevance calculations and scoring process.

The system is further configured to generate a compensating step to eliminate the side effects in both the relevance calculations and scoring. The technique enhances layer-wise relevance propagation with batch normalization for relevance calculations. The added batch normalization step provides a smoothing affect for the relevance backpropagation and removes the unwanted side effects that can affect accuracy. In some embodiments, a Padé approximation can be used in customizing a typical Taylor-based approximation in the standard layer-wise relevance propagation calculation to further provide improved result convergence and better accuracy.

In a particular embodiment, wherein the output of the relevance calculations is a relevance visualization map (e.g., a bitmap of importance for features using pixels or an overall heat map for regions of interest), the constructed compensating step or block generated as a result of this custom process can be applied as a filter to the output visualization to correct the output for the impact of the determined side effects.

In other embodiments, filters may be generated and applied to a relevance visualization based on environment and/or user parameters. For example, the system may compensate any patterns that may deviate from an established typical behavior. For example, a user may travel regularly, wherein a geolocation of the user changes often. In another example, a user may be a small business owner. In yet another example, a user may be a student having unique interaction habits. The system may input these additional characteristics and patterns into the optimization algorithm to compensate for these factors. Further, a machine learning model may be trained with the atypical interaction patterns to identify said patterns. The system may be configured to hide or remove these aspects from the visualization to prevent inaccurate outputs or alerts (i.e., false positives).

In another aspect of the invention, generated relevance visualization maps may be used by the system for training a machine learning model for pattern recognition such as for recognition of known patterns of misappropriation types. The system is configured to identify the misappropriation type in received interaction data (e.g., a new interaction) and guide an analyst by deciphering the relevance calculations from the neural network model that produced the score. As previously discussed, a custom relevance calculation method using a custom layer-wise relevance algorithm with a Padé approximation and batch normalization is utilized by the system. The output of this technique may be a relevance visualization such as a heat map or feature map with coloring, shading, and other signals in a two or three dimensional displayed image constructed by the system. The system is configured to analyze the generated output to assist an analyst in determining the type of misappropriation the resulting visualization matches or resembles.

A machine learning model is trained using historical cross channel interaction data such as misappropriation data (e.g., unauthorized resource transfers), non-misappropriation data (e.g., valid or authorized resource transfers), misappropriation alert data and resolutions, misappropriation claims databases, global misappropriation databases, interaction logs, non-resource transfer based interactions (e.g., account and authentication actions) and the like. In some embodiments, the interaction data used for training the model may comprise labeled data such as data labeled for specific types of misappropriation (e.g., account take over, first party misappropriation, lost or misappropriated resource vehicle, and the like). Using these collections of data, the machine learning model is trained to recognize and identify the underlying heat map and visualization patterns in the feature relevance output maps. When a new interaction or alert is received, the system leverages the machine learning model to estimate a misappropriation type along with a classification output (i.e., misappropriation or not, misappropriation type, etc.). An explanation in the form of one or more reason codes and the misappropriation type visualization is output for analyst review and/or regulatory feedback for explainability. This machine learning-based pattern recognition and misappropriation type identification provides a significant improvement in the alert processing times while further providing reason codes to analysts for explanation.

In another aspect of the invention, the system provides an attention-based, layered classification technique to provide an adaptable relevance calculation that may employ different levels of rigor or attention to specific or abnormal features that may require additional analysis. The technique relies on the concept of "attention" which is a fundamental building block of human intelligence. That said, machine learning models are often static and designed with only a reasonable set of scenarios based on historical data. However, static designs are not adaptable to changes in the received data or in cases that require different levels of rigor for analysis of individual features. Alternatively, in organic systems, after initial processing of incoming data (e.g., visual input) the system focuses on various subsets of the incoming data by increasing attention to specific aspects of the received data. This enables the organic system to have a balance of big picture scoring along with accuracy for detail when needed.

The present invention provides a novel solution to the static architecture problem by processing different scenarios or features with different levels of attention or rigor. The system comprises a sequence of layered neural networks. In each layer a relevance and importance estimations are performed. In one example, an initial layer may receive an input of features for a high-level analysis. When the initial layer relevance and importance estimations are completed, the resulting output from the first layer may then be used as input into a subsequent layer having a heightened rigor level for specific features of interest or abnormalities requiring additional analysis that were identified in the initial layer. For example, if abnormalities (i.e., relevance calculations) point to a specific misappropriation type, a model trained for that misappropriation type can be employed in the second stage for additional or refined scoring with more fine-grain analysis capabilities. The process can continue by employing additional layers until a predetermined level of detail is reached through the analysis. At the end of the process, the individual layer outputs are consolidated, and an overall output is generated.

In yet another aspect of the invention, the system leverages a collection of shadow engines or models to explain the decisions made by a main machine learning engine (e.g., a neural network architecture) and generate logical constructs from customized input data features to make them more explainable to human users. The system constructs an array of shadow engines to focus on various aspects of a decisioning event (e.g., an identification of misappropriation). A final model inputs the shadow engine outputs and consolidates the outputs into a shorter list of explainable logical constructs to determine an overall explanation.

The system customizes the features input to the shadow engines to extract explainable constructs. This process involves machine learning of misappropriation types and back tracing them to number of features in the interaction data. These features are fine-tuned to generate explainable versions for the shadow models. A number of models are specially designed to focus on different aspects of the interaction data to create a big picture explanation through their consolidated output.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, the term "user" may refer to any entity or individual associated with the misappropriation processing and alert system described herein. In some embodiments, a user may be a computing device user, a phone user, a mobile device application user, a customer of an entity or business, a system operator, and/or employee of an entity (e.g., a financial institution). In one embodiment, a user may be a customer accessing a user account via an associated user device, wherein data from an interaction between the user and another user and/or entity is monitored, analyzed, and/or processed by the system. In a specific embodiment, a user is a data analyst receiving output from the system for misappropriation data processing and alerting. In some embodiments, identities of an individual may further include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, wearable devices, cameras, video recorders, audio/video player, global positioning system (GPS) devices, portable digital assistants (PDAs), automated teller machines (ATMs), or any combination of the aforementioned. The device may be used by the user to access the system directly or through an application, online portal, internet browser, virtual private network, or other connection channel.

As used herein, the term "entity" may be used to include any organization or collection of users that may interact with the misappropriation processing and alert system. An entity may refer to a business, company, or other organization that either maintains or operates the system or requests use and accesses the system. In some embodiments, an entity may refer to a financial entity. The terms "financial institution" and "financial entity" may be used to include any organization that processes financial transactions including, but not limited to, banks, credit unions, savings and loan associations, investment companies, stock brokerages, resource management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution.

As used herein, "authentication information" may refer to any information that can be used to authenticate an identify a user and/or a user device. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to at least partially authenticate the identity of the user (e.g., determine that the authentication information is associated with a device and/or account) and determine that the user has authority to access an account or system or otherwise execute an interaction. In some embodiments, the system may be owned or operated by an entity. In such embodiments, the entity may employ additional computer systems, such as authentication servers, to validate and certify data inputted by users within the system.

To "monitor" is to watch, observe, or check something for a special purpose over a period of time. The "monitoring" may occur periodically over the period of time, or the monitoring may occur continuously over the period of time. In some embodiments, a system may actively monitor a data source, data stream, database, or data archive, wherein the system may be configured to reach out to the data source and watch, observe, or check the data source for changes, updates, variations, patterns, and the like. In other embodiments, a system may passively monitor a data source or data stream, wherein the data source or data stream provides information to the system and the system then watches, observes, or checks the provided information. In some embodiments, "monitoring" may further comprise analyzing or performing a process on something such as a data source or data stream either passively or in response to an action or change in the data source or data stream.

As used herein, an "interaction" may refer to any action or communication between one or more users, one or more entities or institutions, and/or one or more devices or systems within the system environment described herein. For example, an interaction may refer to a user interaction with a system or device, wherein the user interacts with the system or device in a particular way. In one embodiment, interactions may be received or extracted from a data stream (e.g., in real-time). An interaction may include user interactions with a user interface of a user application (e.g., clicking, swiping, text or data entry, etc.), authentication actions (e.g., signing-in, username and password entry, PIN entry, etc.), account actions or events (e.g., account access, fund transfers, document or record views, etc.) and the like. In another example, an interaction may refer to a user communication via one or more channels (i.e., phone, email, text, instant messaging, brick-and-mortar interaction, and the like) with an entity and/or entity system to complete an operation or perform an action with an account associated with user and/or the entity. In a specific embodiment, an interaction may comprise a transfer or exchange of resources (e.g., funds, data (i.e., files), goods, service, or the like) between users and/or devices either directly or via an intermediate system (e.g., an entity system). "Interaction data" may refer to any data produced, transferred, exchanged, or otherwise modified as a result of an interaction.

FIG. 1 provides an artificial intelligence-based interaction processing system environment 100, in accordance with one embodiment of the invention. As illustrated in FIG. 1, misappropriation processing and alert system 130 is operatively coupled, via a network 101, to the user device(s) 110 (e.g., a plurality of user devices 110a-110d) and the entity system(s) 120. In this way, the misappropriation processing and alert system 130 can send information to and receive information from the user device 110 and the entity system 120. In the illustrated embodiment, the plurality of user devices 110a-110d provide a plurality of communication channels through which the entity system 120 and/or the misappropriation processing and alert system 130 may communicate with the user 102 over the network 101.

In the illustrated embodiment, the misappropriation processing and alert system 130 further comprises an artificial intelligence (AI) system 130a which may further comprise one or more machine learning models, neural network engines or the like. The misappropriation processing and alert system 130 and the artificial intelligence systems may be separate systems operating together or, alternatively, integrated into a single system.

FIG. 1 illustrates only one example of an embodiment of the system environment 100. It will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the invention. It is further understood that one or more of the servers, systems, and devices can be combined in other embodiments and still function in the same or similar way as the embodiments described herein.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101. The network 101 may further comprise a peer-to-peer communication network.

In some embodiments, the user 102 is an individual interacting with one or more entity systems 120 and/or other user devices via a user device 110 while a data stream or flow between the user device 110 and the entity system 120 and/or other user devices is intercepted and monitored by the misappropriation processing and alert system 130 over the network 101. In some embodiments a user 102 is a user requesting service from the entity or interacting with an account maintained by the entity system 120. In an alternative embodiment, the user 102 is an individual interacting with the misappropriation processing and alert system 130 over the network 101 and monitoring input of information from the entity systems 120 to and from the misappropriation processing and alert system 130 for processing and analysis (e.g., an employee of the entity operating and/or monitoring the systems 120, 130). In a specific embodiment, the user is a data analyst receiving output from the misappropriation processing and alert system 130 to identify potential misappropriation in the interaction data.

FIG. 2 provides a block diagram of a user device 110, in accordance with one embodiment of the invention. The user device 110 may generally include a processing device or processor 202 communicably coupled to devices such as, a memory device 234, user output devices 218 (e.g., a user display device 220, or a speaker 222), user input devices 214 (e.g., a microphone, keypad, touchpad, touch screen, and the like), a communication device or network interface device 224, a power source 244, a clock or other timer 246, a visual capture device such as a camera 216, a positioning system device 242, such as a geo-positioning system device or GPS device, an accelerometer, and the like. In one embodiment, the camera 216 may include a scanner, barcode reader, or any other image capturing device or sensor configured to capture an image or scan readable indicia (e.g., a barcode, label, or the like). The processing device 202 may further include a central processing unit 204, input/output (I/O) port controllers 206, a graphics controller or graphics processing device (GPU) 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 is configured to allow the user device 110 to transmit and receive data and instructions from the other devices and systems of the environment 100. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with other systems such as the entity system 120. In one embodiment, the user application 238 may be configured to allow a user 102 to request and receive output from another system such as the misappropriation processing and alert system 130. In some embodiments, the memory device 234 may store information or data generated by the misappropriation processing and alert system 130 and/or by the processes described herein.

The processing device 202 may be configured to use the communication device 224 to communicate with one or more other devices on a network 101 such as, but not limited to the entity system 120 and the misappropriation processing and alert system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 201. In this regard, the user device 110 may be configured to operate with one or more air interface standards, communication protocols, modulation types, and access types. By way of illustration, the user device 110 may be configured to operate in accordance with any of a number of first, second, third, fourth, and/or fifth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processing device 202. Typically, the one or more applications 238, are loaded into the temporary memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

FIG. 3 provides a block diagram of a misappropriation processing and alert system 130, in accordance with one embodiment of the invention. The misappropriation processing and alert system 130 generally comprises a controller 301, a communication device 302, a processing device 304, and a memory device 306.

As used herein, the term "controller" generally refers to a hardware device and/or software program that controls and manages the various systems described herein such as the user device 110, the entity system 120, and/or the misappropriation processing and alert system 130, in order to interface, monitor, and manage data flow between systems while executing commands to control the systems. In some embodiments, the controller 301 may be integrated into or be placed in one or more of the systems described herein. In other embodiments, the controller 301 may be a separate system or device. In some embodiments, the controller 301 may perform one or more of the processes, actions, or commands described herein.

As used herein, the term "processing device" or "processor" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 304 is operatively coupled to the communication device 302 and the memory device 306. The processing device 304 uses the communication device 302 to communicate with the network 101 and other devices on the network 101, such as, but not limited to the user device 110 and the entity system 120. As such, the communication device 302 generally comprises a modem, server, or other device for communicating with other devices on the network 101.

As further illustrated in FIG. 3, the misappropriation processing and alert system 130 comprises computer-readable instructions 310 stored in the memory device 306, which in one embodiment includes the computer-readable instructions 310 of an interaction data processing application 312, a misappropriation alerting application 313, and an artificial intelligence application comprising one or more machine learning engines 315. The interaction data processing application 312 may be configured to monitor interactions and receive interaction data for processing by the system for the identification of potential misappropriation with the misappropriation alerting application 313. The misappropriation alerting application 313 may be further configured to transmit an alert notification comprising a processed data output (e.g., identified misappropriation, misappropriation types, etc.) and an explanation (e.g., a relevance visualization map, reason codes, logical constructs, or the like) generated by the interaction data processing application 312 to a user for review. The artificial intelligence application 315 may be configured to receive interaction data from the interaction data processing application 312 for analysis using one or more machine learning models, neural networks, or the like.

In some embodiments, the memory device 306 includes data storage 308 for storing data related to the system environment, but not limited to data created and/or used by the interaction data processing application 312, the misappropriation alerting application 313, and the artificial intelligence application 315. Data stored in the data storage 308 may comprise a user information database 314, a historical interaction database 316, misappropriation database 318, and machine learning models 320.

The user information database 314 is used to store information and data associated with one or more users and/or user devices associated with the interaction data received and processed by the system. In some embodiments, the user information database 314 may include user identifying information, user account information, user device information (e.g., device identification information, device serial numbers, digital signatures, device security tokens) and the like. The historical interaction database 316 is used to store information and data associated with historical and interactions, wherein the database 316 is updated with new streaming interaction data. For example, the interaction database 316 comprises user interaction information (e.g., historical interactions, account actions or events, transactions, communications, inputs). The misappropriation database 318 is used to store information and data associated with misappropriation interactions, claims, alerts, logs, response, and the like. In one embodiment the misappropriation database 318 comprises one or more known misappropriation patterns, visualizations, strategies, and the like.

In one embodiment of the invention, the misappropriation processing and alert system 130 may associate with applications having computer-executable program code that instruct the processing device 304 to perform certain functions described herein. In one embodiment, the computer-executable program code of an application associated with the user device 110 and/or the entity systems 120 may also instruct the processing device 304 to perform certain logic, data processing, and data storing functions of the application.

Embodiments of the misappropriation processing and alert system 130 may include multiple systems, servers, computers or the like maintained by one or many entities. In some embodiments, the misappropriation processing and alert system 130 may be part of the entity systems 120. In other embodiments, the entity systems 120 are distinct from the misappropriation processing and alert system 130. The misappropriation processing and alert system 130 may communicate with the entity systems 120 via a secure connection generated for secure encrypted communications between the two systems either over the network 101 or alternative to the network 101.

As illustrated in detail in FIG. 4, the environment 100 further includes one or more entity systems 120 which are connected to the user device 110 and the misappropriation processing and alert system 130. The entity systems 120 may be associated with one or more entities, institutions or the like. The entity systems 120 generally comprise a communication device 402, a processing device 404, and a memory device 406 further comprising data storage 408. The entity systems 120 comprise computer-readable instructions 410 stored in the memory device 406, which in one embodiment includes the computer-readable instructions of an entity application 412. The entity systems 120 may communicate with the user device 110 and the misappropriation processing and alert system 130 to provide access to accounts and resources stored and maintained on the entity systems 120. In some embodiments, the entity system 120 may communicate with the misappropriation processing and alert system 130 during a requested interaction or resource transfer between one or more users and/or user devices in real-time, wherein user interactions or resource transfers may be monitored and tracked by the misappropriation processing and alert system 130. In some embodiments, data storage 408 comprises user information database 416, historical interaction database 418, and/or misappropriation database 420 to either supplement or replace similar data storages or databases on the misappropriation processing and alert system 130 as previously discussed.

The systems of the environment 100 may be used to determine relevance scoring for various data features of machine learning-derived decisions (e.g., classified misappropriation types) while also providing user-friendly result outputs that may be easily analyzed and interpreted by human users (e.g., analysts).

As a first part of the overall solution, the system implements an optimization algorithm for logical grouping of identified data features within a feature mapping visualization (e.g., a two or three dimensional image or chart). FIG. 5 provides a high level process diagram for optimized feature grouping, in accordance with one embodiment of the invention. As illustrated in FIG. 5, the system leverages an optimization algorithm 508 configured to receive data input from various sources to group one or more data features in the input interaction data into subsets of a visualization. The data features are defined or distinct properties or characteristics of the interaction data which may be measured or otherwise processed by the artificial intelligence system to determine a decisioning output. The optimization engine 508 initially receives input from an initial logical grouping of the features 510. For example, similar types of features may be collocated in subsets within the visualization or positioned proximate one another in the image. The optimization algorithm or engine 508 further receives input from a machine learning component 506 which provides a machine learning-derived grouping or placement of the features. The machine learning component 506 receives feature importance and/or relevance data 502 generated from historical and/or streaming interaction data. Additionally, the machine learning-based grouping 506 further receives analyst feedback 504 on intuitive placement of the features to further enhance user-friendliness and interpretability of a final visualization. The initial logical grouping 510, machine learning grouping 506, and the analyst feedback 504 are combined and processed by the optimization algorithm 508 to produce a visualization map, such as, but not limited to, the visualizations illustrated in FIGS. 7 and 8.

As illustrated in block 512, the feature locations within visualization may be iteratively refined and modified over time as additional interaction reference data is collected, misappropriation data or patterns are changed or updated, or the like. In this way, the visualization may stay up-to-date with the most current interaction and misappropriation data.

FIG. 6 provides a high level process flow for generating and displaying an optimized misappropriation relevance visualization, in accordance with one embodiment of the invention. As illustrated in block 610, the system first receives an initial grouping for the data features based a logical grouping of the features. At blocks 620 and 630, feature importance and/or relevance calculations based on recent interaction and misappropriation data in addition to analyst feedback are received and input to a machine learning model. At block 640, the machine learning model analyzes the received data and learns from the data with the analyst input to determine a placement of the features. At block 650, the optimization algorithm calculates a balance between the logical placement, the machine learning-based placement, and the user friendliness-based analyst placement to output a heat map visualization for review at block 660. At block 670, the results are iteratively refined over time with changes in the interaction data, misappropriation data, and analyst feedback.

This improved visualization construction technique overcomes the technical problem inherent to typical construction methods such as random placement, wherein the random placement has limited interpretability for human analysts. Instead, the resulting visualization of the present invention provides enhanced interpretability and explainability of the results to users.

FIG. 7 provides an exemplary visualization output of grouped features, wherein a number data features 702 are processed and arranged in the visualization 704. The features may be organized into a number of subsets within the visualization 704. In some embodiments, the input features are ranked and/or highlighted within the visualization based on their importance and/or relevance to the decisioning event (i.e., in a heat map). FIG. 8 provides a block diagram of an exemplary relevance visualization heat map, in accordance with one embodiment of the invention. The resulting feature importance or relevance visualization may provide both individual feature level importance as shown as dots, and a high-level heat map with important or relevant regions of interest or areas indicated with an overlaid elliptical shape or other free-form shape. In some embodiments, in a heat map, the displayed visualization is configured to display positive and negative areas that contribute to the classification outcome (i.e., the decision) with a spectrum of colors similar to a thermal map. In a non-limiting example, more relevant or important features that provide a positive contribution to the classification may be indicated with a darker red hue while less important or relevant features with a negative contribution may be indicated with a darker blue hue.

Feature relevance calculations are an important step in explainability of AI solutions. The present invention utilizes a backpropagation of a feed-forward score to determine a relevance of the one or more features used to determine the score and provide explainability of the feed-forward result to a human user. For example, a feed-forward score may identify an input interaction having one or more features as being associated with the determined misappropriation decision output. FIG. 9 provides a block diagram of a neural network for feed-forward scoring, in accordance with one embodiment of the invention. As illustrated in FIG. 9, the neural network comprises multiple layers of non-linear functional structure, wherein output from a first layer of nodes is input to the next layer until a final decision is output.

FIG. 10 provides block diagram of a neural network for backpropagation relevance scoring, in accordance with one embodiment of the invention. In many cases, standard backpropagation techniques alone, such as layer-wise relevance propagation, have inherent side effects such as failed assumptions due to the underlying neural network architecture which can impair results. Various classes of neural network architectures introduce such side effects not only in the actual feed-forward scoring process but also in the backwards relevance calculations. In this invention, a machine learning-based technique is employed to learn and remove the neural network architecture specific side effects caused on the relevance calculations and scoring process.

The system leverages a custom relevance calculation to provide explainability through backward propagation of importance or relevance. The technique enhances layer-wise relevance propagation with batch normalization for relevance calculations. The added batch normalization provides a smoothing affect for the relevance back propagation and removes the side effects. FIG. 11 provides a block diagram for batch normalization of a neural network layer output. As illustrated in FIG. 11, the output, $y_t$, of a first layer, $N_1$, is normalized by subtracting a batch mean, $\mu$, and dividing by the batch standard deviation, $\sigma$. In order to maintain optimal weighting in the next layer, $N_2$, the batch normalization multiples the normalized output, $\hat{y}$, by a standard deviation parameter, $\gamma$, and adds a mean parameter, $\beta$. In some embodiments, a Padé approximation can be used in customizing the typical Taylor-based approximation in the standard layer-wise relevance propagation calculation to further provide improved result convergence and better accuracy. In particular, this custom calculation is beneficial in neural network-based arrangements (e.g., a convolutional neural network) which can contain multiple layers of non-linear nodal connections which can complicate deciphering of an output. This normalization step removes the side effects of the neural network architecture from the relevance output.

FIG. 12 provides a high level process diagram for a customized relevance scoring with batch normalization, in accordance with one embodiment of the invention. One or more features 1202 of the interaction data are first mapped using the previously discussed optimization algorithm to generate an optimized grouping of the features 1206. At block 1208, a relevance of the features is calculated to generate a visualization. This calculation uses the customized layer-wise relevance propagation technique discussed above, wherein the outputs of each layer are normalized at block 1210 before a final visualization is output at block 1212.

The system is further configured to generate a compensating block or step to eliminate the side effects in both the relevance calculations and scoring. In a particular embodiment, wherein the output of the relevance calculations is a relevance visualization map (e.g., a bitmap of importance for features using pixels or an overall heat map for regions of interest), the constructed compensating step or block generated as a result of this custom process can be applied as a filter to the visualization to correct the output for impact of the determined side effects. FIG. 13 provides a high level process flow for generating and applying a compensating filter to a relevance visualization, in accordance with one embodiment of the invention. At block 1310, the system first trains a neural network using historical interaction and misappropriation data. At block 1320, using the trained neural network, the system calculates a layer-wise propagation relevance for all nodes in the neural network using the previously discussed customized technique. At block 1330, the side effects of the neural network present in the layer-wise propagation relevance calculation are learned. In one embodiment, the side effects comprise errors or abnormalities associated with at least one of an activation, a weighting, or an assumption of the neural network. At block 1340, the system calculates or generates a compensating block for the layer-wise relevance output based on the neural network architecture. At block 1350, a specific compensating filter is applied for a particular architecture type determined by the system. At block 1360, the system displays the resulting relevance map incorporating the filter. In one embodiment, the relevance visualization map may comprise a heat map visualization for the one or more features.

In other embodiments, filters may be generated and applied to a relevance visualization based on environment and/or user parameters. For example, the system may compensate for users that regularly travel or any other patterns that may deviate from an established typical behavior. The system may input these additional factors into the optimization algorithm to compensate for these factors. Further, a machine learning model may be trained with the atypical interaction patterns to identify said patterns. The system may be configured to hide or remove these aspects from the visualization to prevent inaccurate outputs or alerts (i.e., false positives).

FIG. 14 provides a high level process diagram for machine learning-based misappropriation pattern recognition, training, and matching, in accordance with one embodiment of the invention. In this aspect of the invention, generated relevance visualization maps may be used by the system for training a machine learning model for pattern recognition such as for recognition of known patterns of misappropriation types. The system is configured to identify the misappropriation types in received interaction data (e.g., a new interaction) and guide an analyst by deciphering the relevance calculations from the neural network model that produced the score. As previously discussed, a custom relevance calculation method using a custom layer-wise relevance algorithm with a Padé approximation and batch normalization is utilized by the system. The output of this technique may be a relevance visualization such as a heat map or feature map with coloring, shading, and other signals in a two or three dimensional displayed image. The system is configured to analyze the output to assist an analyst in determining the type of misappropriation the resulting visualization matches or resembles.

A machine learning model is trained using historical cross channel interaction data such as misappropriation data (e.g., unauthorized resource transfers), non-misappropriation data (e.g., valid or authorized resource transfers), misappropriation alert data and resolutions, misappropriation claims databases, global misappropriation databases, interaction logs, and the like. In some embodiments, the interaction data used for training the model may comprise labeled data such as data labeled for specific types of misappropriation (e.g., account take over, first party misappropriation, lost or misappropriated resource vehicle, and the like). The machine learning model is trained to recognize and identify the underlying heat map and visualization patterns in the feature relevance output maps. When a new interaction or alert is received, the system leverages the machine learning model to estimate a misappropriation type along with a classification output (e.g., misappropriation or not). An explanation in the form of one or more reason codes and the misappropriation type visualization is output for analyst review and/or regulatory feedback for explainability. This machine learning-based pattern recognition and misappropriation type identification provides a significant improvement in the alert processing times while further providing reason codes to analysts for explanation.

FIG. 15 provides a high level process flow for machine learning-based training for misappropriation type pattern recognition, in accordance with one embodiment of the invention. At block 1510, the system receives interaction data comprising one or more data features. The system applies the previously discussed feature mapping optimization logic at block 1520 to construct a grouping of the features. At block 1530, the system processes the incoming interaction data and other features in the neural network architecture (i.e., feed-forward scoring). Next, at block 1540 and 1550, the system applies the custom layer-wise feature relevance calculation logic to extract relevance scoring for the one or more features. The system then generates a relevance visualization using the extracted feature relevance at block 1560. At block 1570, a machine learning model inputs the output patterns from the constructed relevance visualization along with known and emerging misappropriation patterns, and labeled data (e.g., labeled misappropriation types data). As a result, the machine learning model is trained to recognize misappropriation patterns from the data and identify similar misappropriation patterns in new, incoming interaction data.

FIG. 16 provides a high level process flow for machine learning-based misappropriation type pattern identification, in accordance with one embodiment of the invention. After processing of the new, incoming interaction data in blocks 1610-1660, the system matches one or more patterns from the generated visualization for the incoming data to one or more known misappropriation patterns from the trained data. At block 1670, the machine learning model outputs the corresponding misappropriation type for the matched visualization. At block 1680, the system is then configured to output the visualization of the new interaction along with the matched and labeled data pattern associated with known misappropriation. In some embodiments, the system may be configured to highlight similarities (e.g., points, regions, patterns, etc.) between the new interaction visualization and the known misappropriation pattern.

In another aspect of the invention, the system provides an attention-based, layered classification technique to provide an adaptable relevance calculation that may employ different levels of rigor or attention to specific or abnormal features that may require additional analysis. The technique relies on the concept of "attention" which is a fundamental building block of human intelligence. That said, machine learning models are often static and designed with only a reasonable set of scenarios based on historical data. However, static designs are not adaptable to changes in the received data, or in cases that require different levels of rigor for analysis of individual features. Alternatively, in organic systems, after initial processing of incoming data (e.g., visual input) the system focuses on various subsets of the incoming data paying attention to different aspects. This enables the organic system to have a balance of big picture scoring along with accuracy for detail when needed.

FIG. 17 provides a high level process diagram for attention-based relevance calculation in a stacked neural network architecture, in accordance with one embodiment of the invention. As illustrated in FIG. 17, a number of input data features and other data (e.g., interaction and misappropriation data) are fed into the sequence of neural network layers. The system of the illustrated embodiment includes a plurality of layers 1-N, wherein each layer has a different level of attention or rigor for at least one of the data features. The present invention provides a novel solution to the static architecture problem by processing different scenarios or features with different levels of rigor. The system comprises a sequence of layered neural networks. In one embodiment, each sequential neural network layer has an increased level of rigor compared to the previous layer. In each layer a relevance and importance estimations are performed. In one example, an initial layer may receive an input of features for a high-level analysis. In the illustrated embodiment, machine learning model J in the first layer determines a high level relevance output for the one or more features. The initial high level relevance output may be a relevance visualization map having one or more abnormalities or regions of interest (e.g., regions i, j, i+1, i+2).

When the initial layer relevance and importance estimations are completed, the resulting output from the first layer may then be used as input into a subsequent layer having a heightened rigor level for the features of interest or abnormalities requiring additional analysis (e.g., layer 2 comprising machine learning models A, B, C, D). For example, if abnormalities (i.e., relevance calculations) point to a specific misappropriation type, a model trained for that misappropriation type can be employed in the second stage for additional or refined scoring with more fine-grain analysis capabilities. The process can continue until a predetermined level of detail is reached through analysis. At the end of the process, the individual layer outputs are consolidated, and an overall or total relevance score output is generated.

In yet another aspect of the invention, the system leverages a collection of shadow engines or models to explain the decisions made by a main machine learning engine such as neural network architecture and generate logical constructs from customized input features to make them more explainable to human users. FIG. 18 provides a high level process diagram for machine learning output relevance scoring using an array of shadow models, in accordance with one embodiment of the invention. The system constructs an array of shadow engines to focus on various aspects of a decisioning event (e.g., an identification of misappropriation type). A final model inputs the shadow engine outputs and consolidates the outputs into a shorter list of explainable logical constructs to determine an overall explanation.

The system customizes the features input to the shadow engines to extract explainable constructs. This process involves machine learning of misappropriation types and back tracing them to number of features. These features are fine-tuned to explainable versions for the shadow models. A number of models are specially designed to focus on different aspects of the interaction data to create a big picture explanation.

FIG. 19A and FIG. 19B provide high level process flows for extracting logical constructs using an array of shadow engines and for consolidation of outputs from an array of shadow engines, respectively, in accordance with one embodiment of the invention. At block 1910, one or more data features are initially analyzed by a main machine learning model. Feature importance analysis is conducted on the one or more data features at block 1920 to identify the features that correspond to a misappropriation type. At block 1930, The features and/or combinations of features are transformed into logical groupings or constructs to be analyzed by additional models (e.g., the shadow models). At block 1940, the system constructs a number of shadow models with the features and feature combinations to analyze aspects of the interaction associated with the features. As illustrated in block 1950, the shadow models are run to focus on different components of the decision event (e.g., determining misappropriation) associated with the interaction. The shadow models output logical constructs wherein additional features and/or supporting data may be incorporated from reference databases or the like at block 1970. The process then continues to block 1990, wherein the system checks for validity of the construct for each output $O_1$-$O_N$. If a consolidation of the individual outputs is successful, the system may output a final explanation output for the main machine learning model based on the individual analyses by the shadow models. In some embodiments, the system may further output the logical constructs and/or reason codes to provide additional explainability to a user. Alternatively, if consolidation was not successful, the system may either return to block 1970 to supplement the output with additional reference data or return to block 1950 to recalculate outputs from the shadow models.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of for providing enhanced artificial intelligence-derived decisioning explainability.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for providing enhanced artificial intelligence-derived decisioning explainability, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for attention-based layered neural network classification, the system comprising:
   a sequence of layered neural networks; and
   a controller configured for controlling data routed through the sequence of layered neural networks, the controller comprising a memory device with computer-readable program code stored thereon, a communication device connected to a network, and a processing device, wherein the processing device is configured to execute the computer-readable program code to:
      receive interaction data comprising data features, wherein the data features are distinct characteristics of the interaction data;
      input the data features into a first neural network layer of the sequence of layered neural networks;
      calculate a first relevance score output for the data features in the first neural network layer, the first neural network layer having a first rigor level for each of the data features;
      identify an abnormal portion of the first relevance score output associated with at least one of the data features;
      input the abnormal portion into a second neural network layer of the sequence of layered neural networks, wherein the second neural network layer comprises a second rigor level for the at least one of the data features, and wherein the second rigor level is higher than the first rigor level;
      calculate a second relevance score output for the at least one of the data features associated with the abnormal portion in the second neural network layer; and
      integrate the first relevance score output and the second relevance score output to generate a total relevance score output.

2. The system of claim 1, wherein the processing device is further configured to execute the computer-readable program code to calculate a relevance score output for at least one of the data features at each neural network layer of the sequence of layered neural networks, and wherein the total relevance score output is a relevance visualization map incorporating the relevance score output from each neural network layer of the sequence of layered neural networks.

3. The system of claim 1, wherein the processing device is further configured to execute the computer-readable program code to determine that a level of detail for each of the data features has reached a predetermined threshold before generating the total relevance score output.

4. The system of claim 1, wherein the interaction data comprises resource transfer data, and wherein the sequence of layered neural networks is configured to identify patterns in the interaction data associated with potential misappropriation.

5. The system of claim 1, wherein the interaction data comprises user interaction data, and wherein the sequence of layered neural networks is configured to identify patterns in the interaction data associated with potential unauthorized account access.

6. The system of claim 1, wherein the second relevance score output is a refined relevance visualization map for the abnormal portion of the first relevance score output.

7. A system for attention-based layered neural network classification, the system comprising:
a first neural network layer;
a second neural network layer; and
a controller configured for controlling sequential data routing through the first and second neural network layers, the controller comprising a memory device with computer-readable program code stored thereon, a communication device connected to a network, and a processing device, wherein the processing device is configured to execute the computer-readable program code to:
receive interaction data comprising data features at the first neural network layer, wherein the data features are distinct characteristics of the interaction data;
calculate a first relevance score output for the data features in the first neural network layer, the first neural network layer having a first rigor level for each of the data features;
identify an abnormal portion of the first relevance score output associated with at least one of the data features;
input the abnormal portion into the second neural network layer, wherein the second neural network layer comprises a second rigor level for the at least one of the data features, and wherein the second rigor level is higher than the first rigor level;
calculate a second relevance score output for the at least one of the data features associated with the abnormal portion in the second neural network layer; and
integrate the first relevance score output and the second relevance score output to generate a total relevance score output.

8. The system of claim 7, wherein the total relevance score output is a relevance visualization map.

9. The system of claim 8, wherein the second relevance score output is a refined relevance visualization map for the abnormal portion of the first relevance score output.

10. The system of claim 7, wherein the processing device is further configured to execute the computer-readable program code to determine that a level of detail for each of the data features has reached a predetermined threshold before generating the total relevance score output.

11. The system of claim 7, wherein the interaction data comprises resource transfer data, and wherein the first neural network layer and the second neural network layer are configured to identify patterns in the interaction data associated with potential misappropriation.

12. The system of claim 7, wherein the interaction data comprises user interaction data, and wherein the first neural network layer and the second neural network layer are configured to identify patterns in the interaction data associated with potential unauthorized account access.

13. A computer-implemented method for attention-based layered neural network classification, the computer-implemented method comprising:
providing a sequence of layered neural networks; and
providing a controller configured for controlling data routed through the sequence of layered neural networks, the controller comprising a memory device with computer-readable program code stored thereon, a communication device connected to a network, and a processing device, wherein the processing device is configured to execute the computer-readable program code to:
receive interaction data comprising data features, wherein the data features are distinct characteristics of the interaction data;
input the data features into a first neural network layer of the sequence of layered neural networks;
calculate a first relevance score output for the data features in the first neural network layer, the first neural network layer having a first rigor level for each of the data features;
identify an abnormal portion of the first relevance score output associated with at least one of the data features;
input the abnormal portion into a second neural network layer of the sequence of layered neural networks, wherein the second neural network layer comprises a second rigor level for the at least one of the data features, and wherein the second rigor level is higher than the first rigor level;
calculate a second relevance score output for the at least one of the data features associated with the abnormal portion in the second neural network layer; and
integrate the first relevance score output and the second relevance score output to generate a total relevance score output.

14. The computer-implemented method of claim 13, wherein the processing device is further configured to execute the computer-readable program code to calculate a relevance score output for at least one of the data features at each neural network layer of the sequence of layered neural networks, and wherein the total relevance score output is a relevance visualization map incorporating the relevance score output from each neural network layer of the sequence of layered neural networks.

15. The computer-implemented method of claim 13, wherein the processing device is further configured to execute the computer-readable program code to determine that a level of detail for each of the data features has reached a predetermined threshold before generating the total relevance score output.

16. The computer-implemented method of claim 13, wherein the second relevance score output is a refined relevance visualization map for the abnormal portion of the first relevance score output.

17. The computer-implemented method of claim 13, wherein the interaction data comprises resource transfer data, and wherein the sequence of layered neural networks is configured to identify patterns in the interaction data associated with potential misappropriation.

18. The computer-implemented method of claim 13, wherein the interaction data comprises user interaction data, and wherein the sequence of layered neural networks is configured to identify patterns in the interaction data associated with potential unauthorized account access.

* * * * *